United States Patent
Emura

(10) Patent No.: US 8,924,263 B2
(45) Date of Patent: Dec. 30, 2014

(54) METHOD, MEDIUM, AND SYSTEM FOR ESTIMATING PURCHASE TO DISPATCH TIME

(75) Inventor: Sadaaki Emura, Tokyo (JP)

(73) Assignee: Rakuten, Inc., Tokyo (JP)

( * ) Notice: Subject to any disclaimer, the term of this patent is extended or adjusted under 35 U.S.C. 154(b) by 50 days.

(21) Appl. No.: 13/883,926

(22) PCT Filed: Oct. 31, 2011

(86) PCT No.: PCT/JP2011/075034
§ 371 (c)(1),
(2), (4) Date: Jun. 12, 2013

(87) PCT Pub. No.: WO2012/073630
PCT Pub. Date: Jun. 7, 2012

(65) Prior Publication Data
US 2013/0339171 A1   Dec. 19, 2013

(30) Foreign Application Priority Data
Nov. 29, 2010   (JP) .................................. 2010-265560

(51) Int. Cl.
*G06Q 30/00* (2012.01)
(52) U.S. Cl.
USPC ........................................................ 705/26.3
(58) Field of Classification Search
CPC ............................................... G06Q 30/0601
USPC .............................................. 705/26.1, 26.3
See application file for complete search history.

(56) References Cited

U.S. PATENT DOCUMENTS 5,924,094 A * 7/1999 Sutter ..................................... 1/1
8,407,154 B1 * 3/2013 Fallows ......................... 705/341
2006/0282546 A1 * 12/2006 Reynolds et al. ............. 709/248

FOREIGN PATENT DOCUMENTS

| CN | 1314650 A | 9/2001 |
| CN | 101009045 A | 8/2007 |
| JP | 2008-117321 A | 5/2008 |
| JP | 2008-304962 A | 12/2008 |
| JP | 2009-199201 A | 9/2009 |
| JP | 2010-211690 A | 9/2010 |
| WO | 0171580 A | 9/2001 |

OTHER PUBLICATIONS

Kaplan, Robert S., and Steven R. Anderson. "Time-driven activity-based costing." harvard business review 82.11 (2004): 131-140.*
Net Auction Nyumon, Economist, Aug. 8, 2005, pp. 122-125.
Japanese Office Action dated Aug. 14, 2012, issued in Japanese Patent Application No. 2012-519807.

* cited by examiner

*Primary Examiner* — Matthew Zimmerman
(74) *Attorney, Agent, or Firm* — Sughrue Mion, PLLC

(57) ABSTRACT

Once a product in an auction has been purchased, a message relay (101) relays messages about sale and purchase of the product exchanged between a seller of the product and a bidder who is the winning bidder of the product, between a seller terminal used by the seller and a bidder terminal used by the winning bidder. A history storage (102) stores a history of the relayed messages. An information generator (103) uses the history to (1) estimate a seller's time that is required by the seller, in a period from when a not-yet purchased product is purchased until the product will be dispatched (2) estimates a bidder's time that is required by the bidder in the period from when the not-yet purchased product is purchased until the product will be dispatched and (3) calculates a sum of the seller's time and bidder's time, and employs the calculated sum as the expected period that is required from when the not-yet purchased product is purchased until the product will be dispatched.

17 Claims, 18 Drawing Sheets

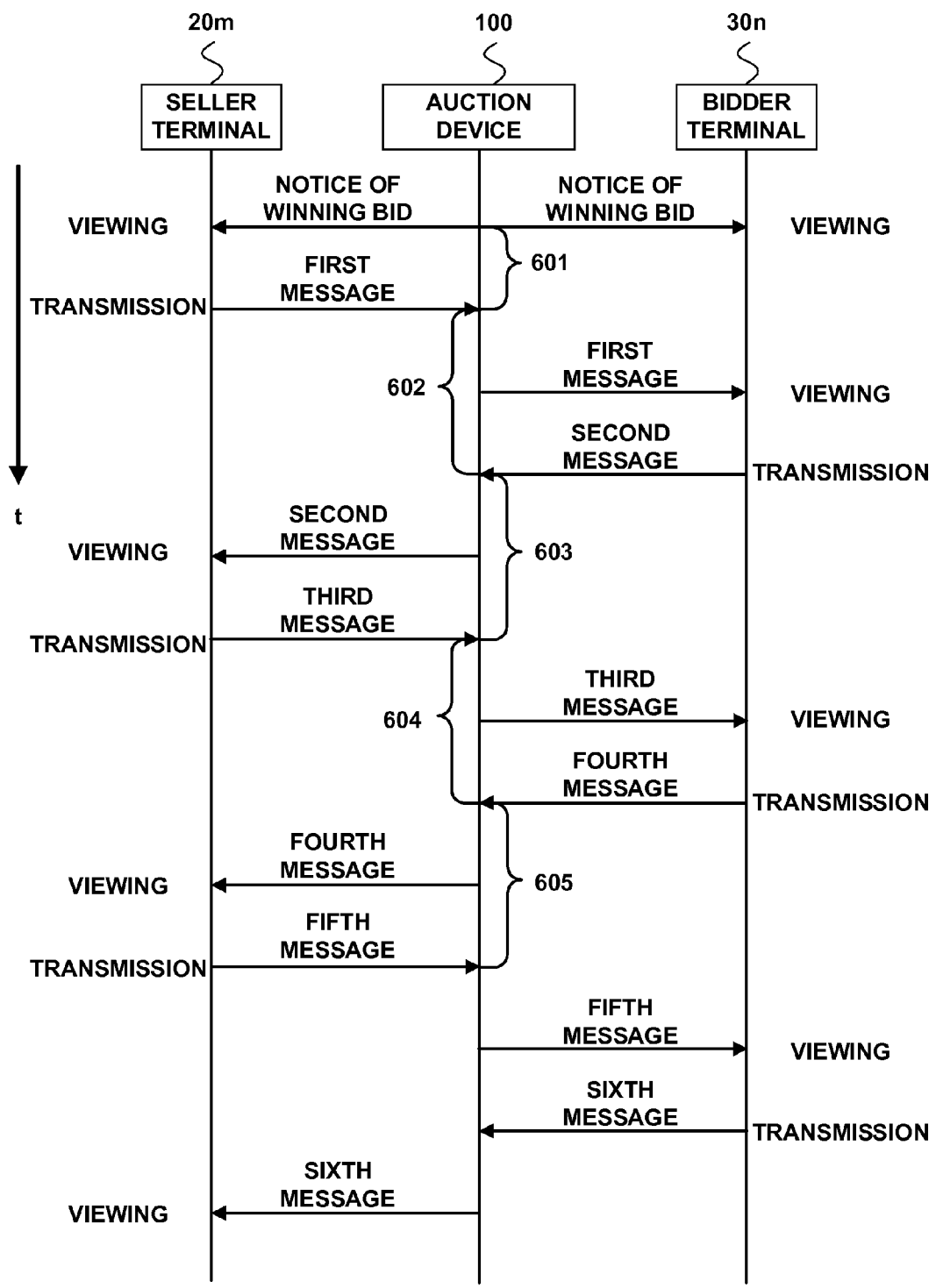

FIG. 5

HISTORY TABLE 102a

| | | SELLER | | | WINNING BIDDER (BIDDER) | | |
|---|---|---|---|---|---|---|---|
| PRODUCT | MESSAGE | USER ID | RECEIPT TIME AND DATE | VIEW TIME AND DATE | USER ID | RECEIPT TIME AND DATE | VIEW TIME AND DATE |
| AAA | NOTICE OF WINNING BID | X | - | 10/11/1 00:00:00 | Z | - | 10/11/1 00:00:00 |
| | FIRST MESSAGE | | 10/11/01 00:30:00 | - | | - | 10/11/01 08:00:00 |
| | SECOND MESSAGE | | - | 10/11/01 17:30:00 | | 10/11/01 08:30:00 | - |
| | THIRD MESSAGE | | 10/11/01 18:00:00 | - | | - | 10/11/01 20:00:00 |
| | FOURTH MESSAGE | | - | 10/11/01 23:00:00 | | 10/11/01 20:30:00 | - |
| | FIFTH MESSAGE | | 10/11/03 10:00:00 | - | | - | 10/11/03 20:00:00 |
| | SIXTH MESSAGE | | - | 10/11/05 23:00:00 | | 10/11/05 20:00:00 | - |
| BBB | NOTICE OF WINNING BID | W | | 10/11/1 00:00:00 | Y | | 10/11/1 00:00:00 |
| | FIRST MESSAGE | | 10/11/01 01:00:00 | | | | 10/11/01 01:30:00 |
| | SECOND MESSAGE | | | 10/11/01 18:00:00 | | 10/11/01 03:00:00 | |
| | THIRD MESSAGE | | 10/11/01 18:30:00 | | | | 10/11/02 00:00:00 |
| | FOURTH MESSAGE | | | 10/11/02 18:00:00 | | 10/11/02 00:30:00 | |
| | FIFTH MESSAGE | | 10/11/02 20:00:00 | | | | 10/11/03 00:00:00 |
| | SIXTH MESSAGE | | | 10/11/04 18:00:00 | | 10/11/04 00:00:00 | |
| ⋮ | ⋮ | ⋮ | ⋮ | ⋮ | ⋮ | ⋮ | ⋮ |

102a1, 102a2, 102a3, 102a4, 102a5, 102a6, 102a7, 102a8

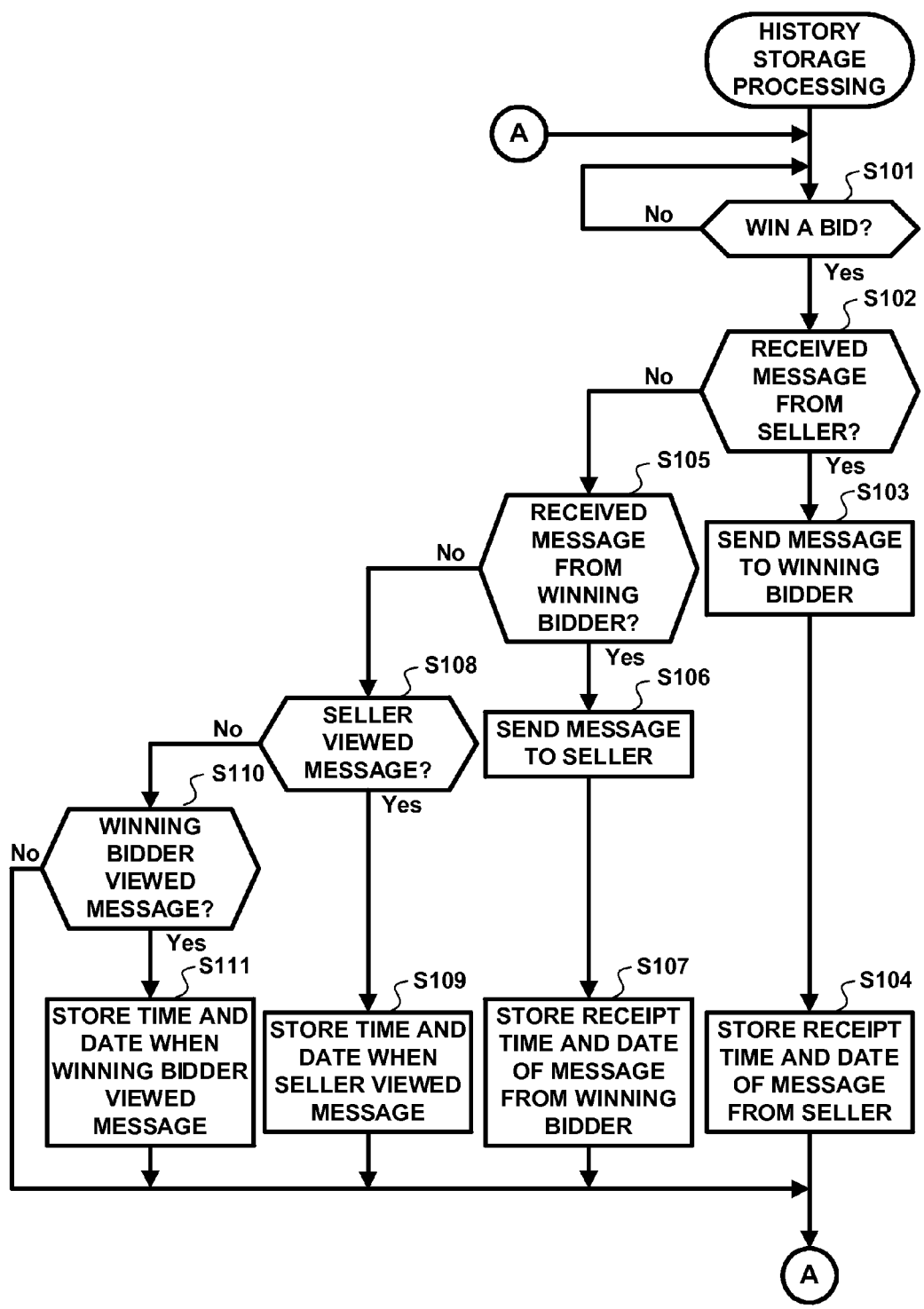

FIG. 10

ADDRESS TABLE 102b

| USER ID | ADDRESS |
|---------|---------|
| X | XXX-XXXX |
| Y | YYY-YYYY |
| Z | ZZZ-ZZZZ |
| W | WWW-WWWW |
| : | : |

102b1 — USER ID column
102b2 — ADDRESS column

FIG. 11

DELIVERY TIME TABLE 102c

| SENDER'S ADDRESS | DESTINATION ADDRESS | DELIVERY TIME |
|---|---|---|
| XXX-XXXX | YYY-YYYY | 2 DAYS |
| XXX-XXXX | ZZZ-ZZZZ | 1 DAY |
| XXX-XXXX | WWW-WWWW | 4 DAYS |
| YYY-YYYY | XXX-XXXX | 2 DAYS |
| : | : | |

SEARCH RESULT TABLE 300a

| | 300a1 | 300a2 | 300a3 | 300a4 | 300a5 | 300a6 | 300a7 |
|---|---|---|---|---|---|---|---|
| | IMAGE | PRODUCT NAME | CURRENT BIDDING PRICE | IMMEDIATE SUCCESSFUL BIDDING PRICE | NUMBER OF BIDDING | REMAINING TIME | EXPECTED PERIOD UNTIL ARRIVAL |
| 701 | IMAGE | CCC | 1500 | 3000 | 6 | 3:00 | 103 HOURS AND 30 MINUTES |
| 702 | IMAGE | CCC | 1000 | - | 2 | 2:00 | 140 HOURS |
| 703 | IMAGE | CCC | 100 | - | 1 | 1:00 | 175 HOURS |
| 704 | IMAGE | CCC | 500 | 10000 | 0 | 3:00 | 180 HOURS |
| 705 | IMAGE | CCC | 500 | - | 1 | ONE DAY | 180 HOURS |

METHOD, MEDIUM, AND SYSTEM FOR ESTIMATING PURCHASE TO DISPATCH TIME

CROSS REFERENCE TO RELATED APPLICATIONS

This application is a National Stage of International Application No. PCT/JP2011/075034 filed Oct. 31, 2011, claiming priority based on Japanese Patent Application No. 2010-265560 filed Nov. 29, 2010, the contents of all of which are incorporated herein by reference in their entirety.

TECHNICAL FIELD

The present invention relates to an auction device that manages a product auction via a network, a control method for the auction device, a program and a non-transitory information recording medium.

BACKGROUND ART

In the current network auction system, products are auctioned via a network. In the network auction, when a product has been purchased, the product goes to the winning bidder, and then the seller and bidder evaluate each other's actions. Generally, the earlier the product is dispatched, the more satisfied the bidder is, that is, the higher evaluation the seller tends to receive. For example, PLT 1 discloses an auction evaluation support system to evaluate the dispatch of a product to the seller.

CITATION LIST

Patent Literature

[PTL 1]: Unexamined Japanese Patent Application Kokai Publication No. 2008-117321

SUMMARY OF INVENTION

Technical Problem

In a network auction as described above, by referring to evaluation and comments about a seller, it can be estimated whether dispatch of a product by the seller is early or late. Meanwhile, there is a demand for considering bidding or winning a bid in an auction, taking into account a specific time that is required until a product will be dispatched. However, it is not until a bidder wins a bid and makes contact with a seller that the bidder can learn the required specific time before the product will be dispatched.

The present invention solves the above problem and has an objective to provide an auction device that is suitable for providing the time that is required for exchange between a bidder and a seller before bidding or winning a bid, a control method for the auction device, a program and a non-transitory information recording medium.

Solution to Problem

An auction device according to a first aspect of the present invention
is communicably connected to seller terminals, each being used by a seller who sells a product in an auction and bidder terminals, each being used by a bidder who is going to bid on a product in the auction;
a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;
a history storage configured to store a history of the relayed messages; and
an information generator configured to determine based on the history stored in the history storage, an expected period that is required from when a not-yet purchased product is purchased until the product is dispatched,
the information generator:
(1) estimating, based on a history of the seller stored in the history storage, a seller's time that is required by the seller, for the period from when the not-yet purchased product is purchased until the product is dispatched;
(2) estimating, based on a history of the bidder stored in the history storage, a bidder's time that is required by the bidder, for the period from when the not-yet purchased product is purchased until the product is dispatched;
(3) calculating a sum of the estimated seller's time and the estimated bidder's time, and employing the calculated sum as the expected period that is required from when the not-yet purchased product is purchased until the product is dispatched.
In the auction device according to the above aspect,
the information generator
(4) determines a delivery time that is required from a dispatch of the product to an arrival of the product on the basis of an address of the seller and an address of the bidder, and delivery time information that indicates the time required for delivering a product from a sender's address to a destination address; and
(5) calculates a sum of the seller's time, bidder's time and delivery time, and employs the calculated sum as an expected period that is required from when the product is purchased until the product arrives.
The auction device according to the above aspect, further includes:
an information request receiver configured to receive an information request sent from the bidder terminal; and
an information response transmitter configured to send an information response to the bidder terminal that sent the information request,
the information generator
determining the expected period for a product of the received information request,
the information response transmitter
sending the expected period for the product of the information request as the information response.
In the auction device according to the above aspect
the message relay, after the product is purchased,
(1) receives a first message addressed to the winning bidder from a seller terminal that is used by the seller, the first message inquiring about an address of the winning bidder and a preferred payment method, and relays the first message to a bidder terminal;
(2) receives a second message addressed to the seller from the bidder terminal, the second message informing the seller of the address of the winning bidder and a preferred payment method, and relays the second message to the seller terminal;
(3) receives a third message addressed to the winning bidder from the seller terminal, the third message informing the winning bidder of a payment amount for the auction, and relays the third message to the bidder terminal;

(4) receives a fourth message addressed to the seller from the bidder terminal, the fourth message informing the seller that payment has been completed, and relays the fourth message to the seller terminal;

(5) receives a fifth message addressed to the winning bidder from the seller terminal, the fifth message informing the winning bidder that the product has been dispatched, and relays the fifth message to the bidder terminal; and (6) receives a sixth message addressed to the seller from the bidder terminal, the sixth message informing the seller that the product has arrived, and relays the sixth message to the seller terminal;

the information generator calculating, for each of auctions at which the seller sold a product, a sum of time from when the product was purchased until receipt of the first message, time from receipt of the second message until receipt of the third message, and time from receipt of the fourth message until receipt of the fifth message, and estimates that an average of the calculated sums for the auctions is the seller's time; and calculating, for each of the auctions at which the bidder won a bid on a product, a sum of time from receipt of the first message until receipt of the second message and time from receipt of the third message until receipt of the fourth message, and estimating that an average of the calculated sums for the auctions is the bidder's time.

The auction device according to the above aspect further includes:

a designation request receiver configured to receive a designation request to specify a bidder's time from the bidder terminal, wherein the information generator, if the designation request is received, calculates the sum using the specified bidder's time instead of the estimated bidder's time.

An auction device according to a second aspect of the present invention is communicably connected to seller terminals, each being used by a seller who sells a product in an auction and bidder terminals, each being used by a bidder who is going to bid on a product in the auction, and includes:

a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;

a history storage configured to store a history of the relayed messages;

an information generator configured to estimate, based on the history of the seller stored in the history storage, a seller's time that is required by the seller for a period from when a not-yet purchased product is purchased until the product is dispatched;

an information request receiver configured to receive an information request sent from the bidder terminal; and an information response transmitter configured to send an information response to the bidder terminal that sent the information request;

the information generator estimating a seller's time for a product of the information request;

the information response transmitter sending the seller's time of the product of the information request as the information response.

An auction device according to a third aspect of the present invention is communicably connected to seller terminals, each being used by a seller who sells a product in an auction and bidder terminals, each being used by a bidder who is going to bid on a product in the auction, and includes:

a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;

a history storage configured to store a history of the relayed messages;

an information generator configured to estimate, based on the history of the bidder stored in the history storage, a bidder's time that is required by the bidder, for a period from when a not-yet purchased product is purchased until the product is dispatched;

an information request receiver configured to receive an information request sent from the seller terminal; and an information response transmitter configured to send an information response to the seller terminal that sent the information request;

the information generator estimating a bidder's time for a product of the information request, the information response transmitter sending the bidder's time for the product of the information request as the information response.

A control method according to a fourth aspect of the present invention is performed by an auction device communicably connected to seller terminals, each being used by a seller who sells a product in an auction and bidder terminals, each being used by a bidder who is going to bid on a product in the auction, the auction device including a message relay, a history storage and an information generator, and the control method includes:

a message relay step at which, once a product in the auction has been purchased, the message relay relays messages about sale and purchase of the product exchanged between a seller of the product and a bidder who is the winning bidder of the product, between a seller terminal used by the seller and a bidder terminal used by the winning bidder;

a history storage step at which the history storage stores a history of the relayed messages; and an information generation step at which the information generator determines, based on a history stored in the history storage, an expected period that is required from when a not-yet purchased product is purchased until the product is dispatched.

the information generator (1) estimating, based on a history of the seller stored in the history storage, a seller's time that is required by the seller, for the period from when the not-yet purchased product is purchased until the product is dispatched;

(2) estimating, based on a history of the bidder stored in the history storage, a bidder's time that is required by the bidder, for the period from when the not-yet purchased product is purchased until the product is dispatched; and (3) calculating a sum of the estimated seller's time and the estimated bidder's time, and employing the calculated sum as the expected period that is required from when the not-yet purchased product is purchased until the product is dispatched.

A program according to a fifth aspect of the present invention causes a computer to function as an auction device, the auction device communicably connected to seller terminals, each being used by a seller who sells a product in an auction and bidder terminals, each being used by a bidder who is going to bid on a product in the auction, the program causing the computer function as:

a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;

a history storage configured to store a history of the relayed messages; and an information generator configured to determine, based on the history stored in the history storage, an expected period that is required from when a not-yet purchased product is purchased until the product is dispatched;

the information generator:

(1) estimating, based on a history of the seller stored in the history storage, a seller's time that is required by the seller, for the period from when the not-yet purchased product is purchased until the product is dispatched;

(2) estimating, based on a history of the bidder stored in the history storage, a bidder's time that is required by the bidder, for the period from when the not-yet purchased product is purchased until the product is dispatched;

(3) calculating a sum of the estimated seller's time and the estimated bidder's time, and employing the calculated sum as the expected period that is required from when the not-yet purchased product is purchased until the product is dispatched.

A non-transitory, computer-readable information recording medium according to a sixth aspect of the present invention has recorded a program that causes a computer to function as an auction device communicably connected to seller terminals, each being used by a seller who sells a product in an auction and bidder terminals, each being used by the bidder who is going to bid on a product in the auction, the program causing the computer function as:

a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;

a history storage configured to store a history of the relayed messages; and an information generator configured to determine, based on the history stored in the history storage, an expected period that is required from when a not-yet purchased product is purchased until the product is dispatched;

the information generator:

(1) estimating, based on a history of the seller stored in the history storage, a seller's time that is required by the seller, for the period from when the not-yet purchased product is purchased until the product is dispatched;

(2) estimating, based on a history of the bidder stored in the history storage, a bidder's time that is required by the bidder, for the period from when the not-yet purchased product is purchased until the product is dispatched;

(3) calculating a sum of the estimated seller's time and the estimated bidder's time, and employing the calculated sum as the expected period that is required from when the not-yet purchased product is purchased until the product is dispatched.

A program of the present invention can be recorded on a non-transitory, computer-readable information recording medium such as a compact disk, a flexible disk, a hard disk, a magnetic optical disk, a digital video disk, a magnetic tape and a semiconductor memory.

The above program can be distributed and sold via a computer network, separately from the computer on which the program is executed. The above information recording medium can also be distributed and sold separately from a computer.

Advantageous Effects of Invention

The present invention can provide an auction device that is suitable for understanding the time that is required for an exchange between a bidder and a seller before bidding or winning a bid, and a control method for the auction device, a program and a non-transitory information recording medium.

BRIEF DESCRIPTION OF DRAWINGS

FIG. 4 is a diagram illustrating an example of messages exchanged between an auction device, a seller terminal and a bidder terminal after a bid is won;

FIG. 5 is a diagram for explaining a history table;

FIG. 6 is a flow chart for explaining history storage processing according to Embodiment 1;

FIG. 10 is a diagram for explaining an address table;

FIG. 11 is a diagram for explaining a delivery time table;

FIG. 15 is a diagram for explaining a search result table;

DESCRIPTION OF EMBODIMENTS

Figure 1:
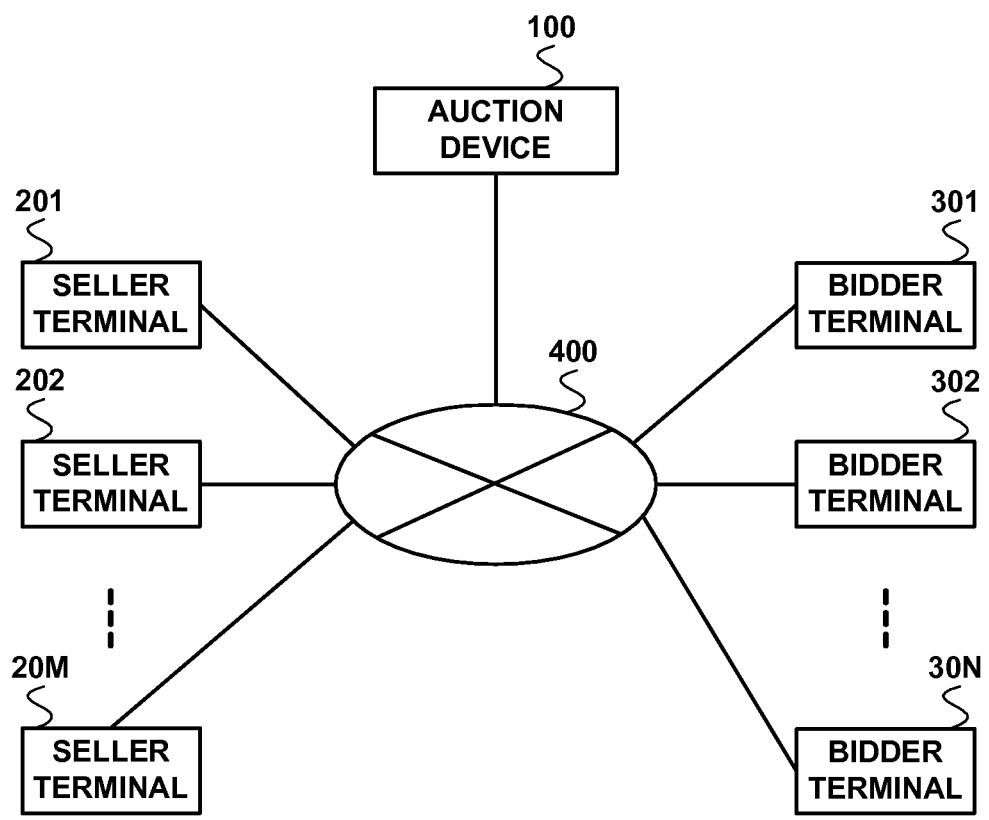
FIG. 1 is a diagram illustrating the relationship between an auction device, seller terminals and bidder terminals according to an embodiment of the present invention.

An auction device 100 according to embodiments of the present invention is connected to an Internet 400, as illustrated in FIG. 1. To the Internet 400 are connected a plurality of seller terminals 20*m* (m=1 to M: M is an arbitrary number) and a plurality of bidder terminals 30*n* (n=1 to N: N is an arbitrary number). The seller terminals 20*m* are operated by sellers that auction products online; and the bidder terminals 30*n* are operated by bidders that are going to bid for products auctioned online. The auction device 100 manages sale and purchase between sellers and bidders regarding products auctioned from the seller terminals 20*m* via the Internet 400.

Hereinafter, a typical information processor 500 that realizes the auction device 100 according to embodiments of the present invention will be described.

(1. Schematic Configuration of Information Processor)

Figure 2:
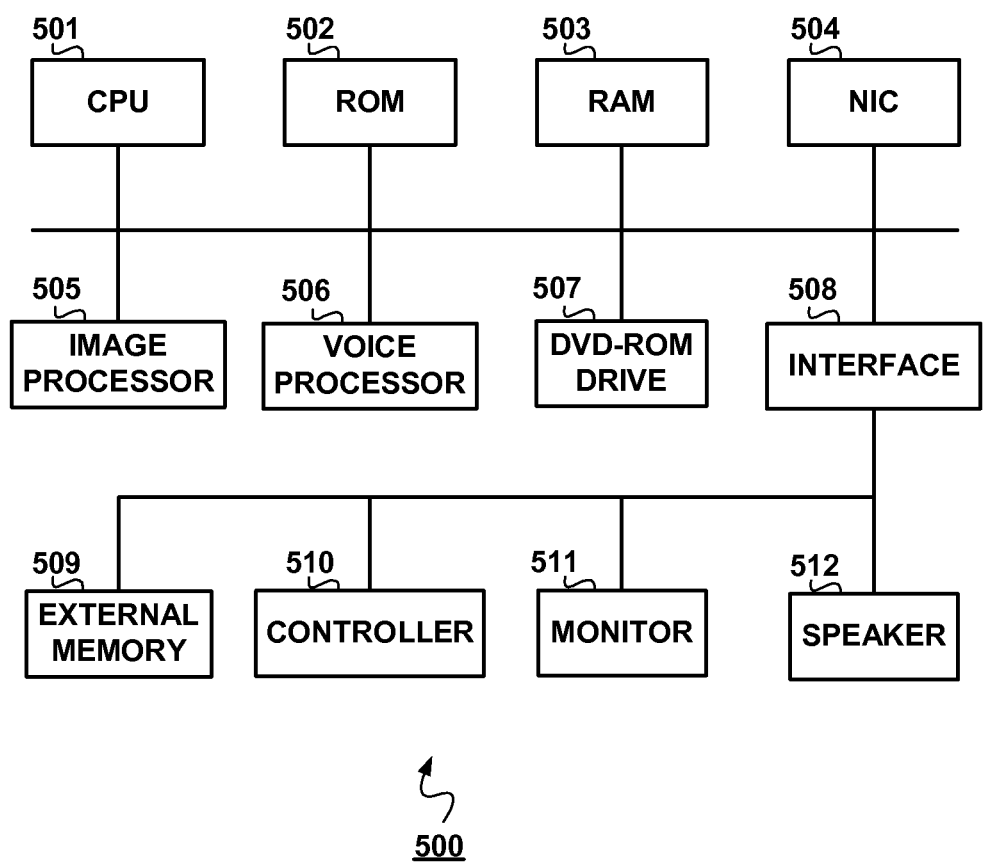
FIG. 2 is a diagram illustrating a schematic configuration of a typical information processor that realizes an auction device according to an embodiment of the present invention.

The information processor 500 includes a CPU (Central Processing Unit) 501, a ROM (Read-only Memory) 502, a RAM (Random Access Memory) 503, an NIC (Network Interface Card 504, an image processor 505, a voice processor 506, a DVD-ROM (Digital Versatile Disc ROM) drive 507, an interface 508, an external memory 509, a controller 510, a monitor 511 and a speaker 512, as illustrated in FIG. 2.

The CPU 501 controls the entire operation of the information processor 500, is connected to, and exchanges control signals and data with each component.

The ROM 502 has recorded an initial program loader (IPL), which is executed immediately after power activation, and execution of the IPL reads a predetermined program into the RAM 503, thereby starting the CPU 501 execution. The ROM 502 has recorded a program of an operating system necessary for controlling the entire operation of the information processor 500 and various data.

The RAM 503 temporarily stores data and a program, and has a program and data read out from a DVD-ROM and other data necessary for communication.

The NIC 504 is used for connecting the information processing device 500 to a computer communication network such as the Internet 400 and is composed of, for example, what is in compliance with a 10BASE-T/100BASE-T standard used for establishing a LAN (local area network), an analog modem for connecting to the Internet through a phone line, an ISDN (integrated services digital network) modem, an ADSL (asymmetric digital subscriber line) modem, a cable modem for connecting to the Internet through a cable television circuit and/or the like, as well as an interface (unrepresented) intermediating between any of them and the CPU 501.

Data read from a DVD-ROM and/or the like is processed by an image operation processor (not illustrated) provided in the CPU 501 or the image processor 505, and then the processed data is recorded in a frame memory (not illustrated) in the image processor 505. The image information recorded in the frame memory is converted to a video signal at a predetermined synchronous timing and is outputted to the monitor 511. This allows for various image displays.

The voice processor 506 converts voice data read from a DVD-ROM and/or the like to an analog voice signal, and is outputted through the speaker 512 connected to the voice processor 506. The voice processor 506 also generates a sound to be emitted during processing performed by the information processor and outputs voice corresponding to the sound through the speaker 512, under control of the CPU 501.

A DVD-ROM to be loaded to the DVD-ROM drive 507 stores, for example, a program for implementing the auction device 100 according to the embodiments. Under control of CPU 501, the DVD-ROM drive 507 performs read-out processing on a DVD-ROM loaded thereto to read necessary program and data, which are temporarily stored in the RAM 503 and/or the like.

To the interface 508 are connected the external memory 509, controller 510, monitor 511 and speaker 512 that can be removed.

In the external memory 509 are stored data relating to user's personal information and/or the like that can be rewritten.

The controller 510 receives operation inputs performed at various setting about the information processor 500. A user of the information processor 500 can properly record data in the external memory 509 by inputting an instruction via the controller 510.

The monitor 511 presents data outputted by the image processor 505 to the user of the information processor 500.

The speaker 512 presents voice data outputted by the voice processor 506 to the user of the information processor 500.

The information processor 500 may be configured to use an external mass storage device such as a hard disk to have the same function as that of the ROM 502, RAM 503, external memory 509, DVD-ROM loaded to the DVD-ROM drive 507 or the like.

Hereinafter, a functional configuration of the auction device 100 according to Embodiments 1 to 4 that is realized by the above information processor 500 will be described with reference to FIGS. 1 to 18. By turning on the information processor 500, a program to cause the information processor 500 to function as the auction device 100 according to the embodiments is executed, thereby realizing the auction device 100 according to Embodiments 1 to 4.

(2. Schematic Configuration of Auction Device According to Embodiment 1)

An auction device 100 according to Embodiment 1 stores a history of messages exchanged between a seller and a bidder after a bid is won in an auction, and determines an expected period that is required until a product is dispatched on the basis of the history before a bid is won.

Figure 3:
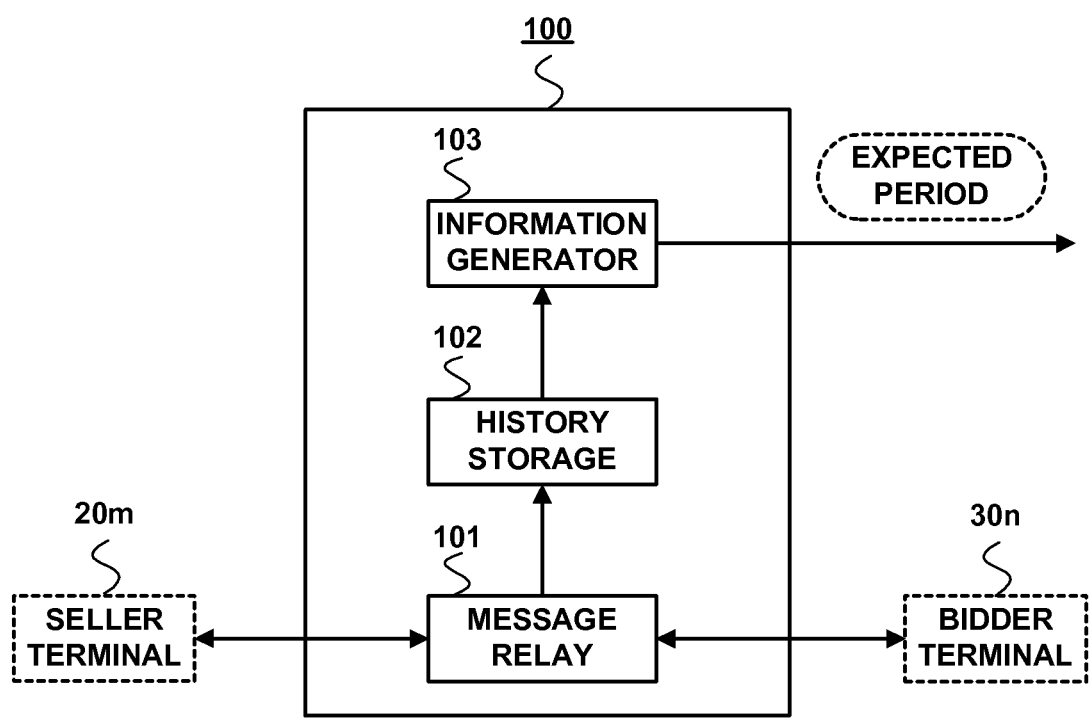
FIG. 3 is a diagram illustrating a schematic configuration of an auction device according to Embodiment 1.

The auction device 100 according to Embodiment 1 includes a message relay 101, a history storage 102 and an information generator 103, as illustrated in FIG. 3.

The message relay 101, once an auctioned product has been purchased, relays messages about the sale and purchase of the product between a seller of the product and a bidder who is the winning bidder of the product, between a seller terminal 20$m$ that is used by the seller and a bidder terminal 30$n$ that is used by the winning bidder.

In the present embodiment, the CPU 501 and NIC 504 work together to function as the message relay 101.

FIG. 4 illustrates an example of messages exchanged between a seller and a winning bidder (bidder) after an auctioned product has been purchased. Messages from the seller to the winning bidder and messages from the winning bidder to the seller are sent through a website managed by the auction device. Meanwhile, messages from the auction device to the seller and the winning bidder are sent by an e-mail or the like.

Once an auctioned product has been purchased, the auction device 100 informs a seller terminal 20$m$ of a seller of the product and a bidder terminal 30$n$ of a winning bidder of the product that the product has been purchased and the auction is closed (notice of winning bid).

Once the seller has received the notice of a winning bid, the seller will log into the website of the auction device 100 to send a first message to the winning bidder to inquire about the address of the winning bidder, a preferred payment method and the like.

The winning bidder logs into the website of the auction device 100 to view the first message received from the seller. The winning bidder sends a second message to the seller to specify his/her address, preferred payment method and the like.

The seller logs into the website of the auction device 100 to view the second message received from the winning bidder. The seller calculates a payment amount for the purchased product on the basis of the specified address and payment method, and sends a third message to the winning bidder to inform the winning bidder of the calculated payment amount.

The winning bidder logs into the website of the auction device 100 to view the third message received from the seller. The winning bidder pays the payment amount specified by the seller by the payment method specified in the second message, and then sends a fourth message to the seller to inform the seller that the payment has been completed.

The seller logs into the website of the auction device 100 to view the fourth message received from the winning bidder. The seller checks his/her bank account to confirm that the payment has been completed, and then dispatches the product to the specified address. After dispatch, the seller sends a fifth message to the winning bidder to inform the winning bidder that the product has been dispatched.

The winning bidder logs into the website of the auction device 100 to view the fifth message received from the seller. On receiving the product, the winning bidder sends a sixth message to the seller to inform the seller that the product has arrived.

The seller logs into the website of the auction device 100 to view the sixth message received from the winning bidder. The seller learns that the product has arrived at the winning bidder's address safely.

The message relay 101 relays the above messages between the seller terminal 20m and the bidder terminal 30n.

The history storage 102 stores a history of messages relayed by the message relay 101.

In the present embodiment, the RAM 503 or the external memory 509 functions as the history storage 102.

For example, assume that messages are exchanged between the seller and the winning bidder, as illustrated in FIG. 4. In this case, the history storage 102 stores the time and date when each message is sent (that is, the time and date when the auction device 100 receives each message) and the time and date when each message is viewed. FIG. 5 illustrates a history table 102a that has recorded a receipt time and date and a view time and date of each message. To the history table 102a are recorded a purchased "Product 102a1", "Message 102a2" sent and received between a seller and a bidder, "User ID 102a3" of the seller, "Receipt Time and Date 102a4" when the auction device 100 receives a message that the seller has sent to the winning bidder, "View Time and Date 102a5" when the seller views a message sent from the auction device 100 or the winning bidder, "User ID 102a6" of the winning bidder, "Receipt Time and Date 102a7" when the auction device 100 receives a message that the winning bidder has sent to the seller and "View Time and Date 102a8" when the winning bidder views a message sent from the auction device 100 or the seller, in association with each other. The Time and date when the auction device 100 sends a notice of winning bid to the seller terminal 20m or to the bidder terminal 30n is deemed as the time and date when the seller or the winning bidder views the notice of winning bid. That is, the history table 102a in FIG. 5 shows, after a bidder Z (whose user ID is "Z") wins a bid for a product "AAA" auctioned by a seller X (whose user ID is "X"), receipt time and date and view time and date of each message exchanged between the winning bidder Z and the seller X, and also shows, after a bidder Y (whose user ID is "Y") wins a bid for a product "BBB" auctioned by a seller W (whose user ID is "W"), receipt time and date and view time and date of each message exchanged between the winning bidder Y and the seller W.

The information generator 103 determines an expected period (hereinafter referred to as "expected period until dispatch") that is required from when a not-yet purchased product is purchased until the product will be dispatched, based on a history stored in the history storage 102. Specifically, the information generator 103 estimates, based on a history stored in the history storage 102, if a not-yet purchased product is purchased, a seller's time required by the seller of the product and a bidder's time required by the bidder of the product in a period from when the product has been purchased until the product will be dispatched. Then, the information generator 103 calculates a sum of the seller's time and bidder's time and employs the calculated sum as an expected period until dispatch of the product.

In the present embodiment, the CPU 501 functions as the information generator 103.

Hereinafter will be described, as an example, a method in which the information generator 103 determines an expected period until dispatch if the bidder Y wins a bid for a product "CCC" auctioned by the seller X.

The information generator 103 calculates a seller's time of the seller X and a bidder's time of the bidder Y to determine an expected period until dispatch, by referring to the history table 102a in FIG. 5.

The information generator 103 first refers to the history table 102a in FIG. 5 to extract a history of the seller X regarding an auctioned and purchased product. The information generator 103 next calculates time required from when the seller X received a notice of winning bid until the product was dispatched, on the basis of the extracted history.

Here, "time required from when a seller received a notice of winning bid until the product was dispatched" is a sum of a period 601 from when the auction device 100 sent a notice of winning bid to a seller terminal 20m (a seller viewed a notice of winning bid) until the auction device 100 received the first message (a message of inquiry about a preferred payment method and the like) from the seller terminal 20m, a period 603 from when the auction device 100 received the second message (a message to specify a preferred payment method and the like) from a bidder terminal 30n until the auction device 100 received a third message (a message of payment amount notice) from the seller terminal 20m, and a period 605 from when the auction device 100 received a fourth message (a message of payment completion notice) from the bidder terminal 30n until the auction device 100 received a fifth message (a message of dispatch completion notice) from the seller terminal 20m in FIG. 4. The period 601 may be the period from when the auction was closed until the auction device 100 received the first message from the seller terminal 20m.

That is, the information generator 103 refers to the history table 102a in FIG. 5 to determine, for the seller X, time corresponding to the period 601, time corresponding to the period 603 and time corresponding to the period 605.

The period 601 is from time the and date when the seller X viewed the notice of winning bid (Nov. 1, 2010 at 00:00:00) until the time and date when the auction device 100 received the first message from the seller X (Nov. 1, 2010 at 00:30:00), that is, 30 minutes.

The period 603 is from the time and date when the auction device 100 received the second message from the winning bidder Z (Nov. 1, 2010 at 08:30:00) until the time and date when the auction device 100 received the third message from the seller X (Nov. 1, 2010 at 18:00:00), that is, 9 hours and 30 minutes.

The period 605 is from the time and date when the auction device 100 received the fourth message from the winning bidder Z (Nov. 1, 2010 at 20:30:00) until the time and date when the auction device 100 received the fifth message from the seller X (Nov. 3, 2010 at 10:00:00), that is, 37 hours and 30 minutes.

Accordingly, "time required from when a seller received a notice of winning bid until a product was dispatched" of the seller X is 47 hours and 30 minutes (30 minutes+9 hours and 30 minutes+37 hours and 30 minutes).

The information generator 103 employs the "time required from when a seller received a notice of winning bid until a product was dispatched" determined as described above as a seller's time that is required by the seller X if the product "CCC" is purchased. If there are a plurality of histories regarding a product auctioned by the seller X being purchased, "time required from when a seller received a notice of winning bid until a product was dispatched" is determined for each of the products, and an average of the determined times is calculated as a seller's time that is required by the seller X if the product "CCC" is purchased. Alternatively, "time required from when a seller received a notice of winning bid until a product was dispatched" determined from the latest history may be a seller's time.

The information generator 103 next refers to the history table 102a in FIG. 5 to extract a history regarding the bidder Y winning a bid for a product. The information generator 103 calculates, from the extracted history, the time required from when the bidder Y received a notice of winning bid until a product was dispatched.

Here, "time required from when the bidder Y received a notice of winning bid until a product was dispatched" is a sum of a period 602 from when the auction device 100 received the first message (a message of inquiry about a preferred payment method and the like) from the seller terminal 20m until the auction device 100 received the second message (a message to specify a preferred payment method and the like) from the bidder terminal 30n and a period 604 from when the auction device 100 received the third message (a message of payment amount notice) from the seller terminal 20m until the auction device 100 received the fourth message (a message of payment completion notice) from the bidder terminal 30n in FIG. 4.

That is, the information generator 103 refers to the history table 102a in FIG. 5 to determine the time corresponding to the period 602 and the time corresponding to the period 604 for the bidder Y.

The period 602 is from the time and date when the auction device 100 received the first message from the seller W (Nov. 1, 2010 at 01:00:00) until the time and date when the auction device 100 received the second message from the bidder Y (Nov. 1, 2010 at 03:00:00), that is, 2 hours.

The period 604 is from the time and date when the auction device 100 received the third message from the seller W (Nov. 1, 2010 at 18:30:00) until the time and date when the auction device 100 received the fourth message from the bidder Y (Nov. 2, 2010 at 00:30:00), that is, 6 hours. In this example, the bidder Y used the Internet to perform online payment.

Accordingly, "time required from when a bidder received a notice of winning bid until a product was dispatched" for the bidder Y is 8 hours (2 hours+6 hours).

The information generator 103 employs "time required from when a bidder received a notice of winning bid until a product was dispatched" determined as described above as a bidder's time that is required by the bidder Y if the bidder Y wins a bid for the product "CCC". If there are a plurality of histories that the bidder Y won a bid for a product, "time required from when a bidder received a notice of winning bid until a product was dispatched" is determined for each of the products, and an average of the determined times is calculated as the bidder's time that is required by the bidder Y if the bidder Y wins a bid for the product "CCC". Alternatively, "time required from when a bidder received a notice of winning bid until a product was dispatched" determined from the latest history may be the bidder's time.

Then, the information generator 103 adds the seller's time determined for the seller X, "47 hours and 30 minutes" and the bidder's time determined for the bidder Y, "8 hours" to get "55 hours and 30 minutes" as a sum, and employs the sum as an expected period until dispatch if the bidder Y wins a bid for the product "CCC" auctioned by the seller X.

(3. Operation of Auction Device According to Embodiment 1)

Hereinafter, history storage processing performed by each part of the auction device 100 is described with reference to the flow chart in FIG. 6. Once a seller and a bidder have started to exchange messages via the website managed by the auction device 100, the CPU 501 starts history storage processing illustrated in the flow chart in FIG. 6.

The CPU 501 determines whether a product has been purchased through a network auction (Step S101). If the CPU 501 determines that the product has been purchased (Step S101; Yes), the message relay 101 determines whether it has received a message from a seller (Step S102). Meanwhile, if the CPU 501 determines that the product has not been purchased yet (Step S101; No), the CPU 501 stands by.

If the message relay 101 determines it has received a message from the seller (Step S102; Yes), the message relay 101 informs the winning bidder of the product that a message from the seller has been received (Step S103). Then, the CPU 501 stores the time and date when the message relay 101 received the message from the seller in the history storage 102 (Step S104). For example, when a first message was received from a seller terminal of the seller X on Nov. 1, 2010 at 00:30:00, the CPU 501 registers the time and date when the first message was received in the history table 102a as illustrated in FIG. 5.

Meanwhile, the message relay 101 determines it has not received a message from the seller (Step S102; No), the message relay 101 determines whether it has received a message from the winning bidder (Step S105). If the message relay 101 determines it has received a message from the winning bidder (Step S105; Yes), the message relay 101 informs the seller of the product that the message from the winning bidder has been received (Step S106). Then, the CPU 501 stores the time and date when the message relay 101 received the message from the winning bidder in the history storage 102 (Step S107). For example, when a second message was received from a bidder terminal of the winning bidder Z on Nov. 1, 2010 at 08:30:00, the CPU 501 registers the time and date when the second message was received in the history table 102a, as illustrated in FIG. 5.

At Step S105, if the message relay 101 determines it has not received a message from the winning bidder (Step S105; No), the message relay 101 determines whether the seller has viewed a message to the seller (Step S108). If the message relay 101 determines that the seller has viewed the message (Step S108; Yes), the CPU 501 stores the time and date when the message relay 101 received viewing of the seller in the history storage 102 (Step S109). For example, when the seller X viewed the second message from the winning bidder Z on Nov. 1, 2010 at 17:30:00, the CPU 501 registers the time and date when the second message was viewed in the history table 102a, as illustrated in FIG. 5.

At Step S108, the message relay 101 determines that the seller has not viewed the message to the seller (Step S108; No), the message relay 101 determines whether the winning bidder has viewed the message to the winning bidder (Step S110). If the message relay 101 determines that the winning bidder has viewed the message (Step S110; Yes), the CPU 501 stores the time and date when the message relay 101 received viewing of the winning bidder in the history storage 102 (Step S111). For example, when the winning bidder Z viewed the first message from the seller X on Nov. 1, 2010 at 08:00:00, the CPU 501 registers the time and date when the first message was viewed in the history table 102a, as illustrated in FIG. 5. Meanwhile, if the message relay 101 determines that the winning bidder has not viewed the message to the winning bidder (Step S110; No), processing returns to Step S101.

Next, information generation processing performed by the information generator 103 in the auction device 100 will be described with reference to the flow chart in FIG. 7. Once a bidder has requested the auction device 100 to present an expected period until dispatch of a product, the CPU 501 starts information generation processing illustrated in the flow chart in FIG. 7. Hereinafter will be described, as an example, a case where the bidder Y requests the auction device 100 to present an expected period until dispatch of the product "CCC" auctioned by the seller X.

Figure 8:
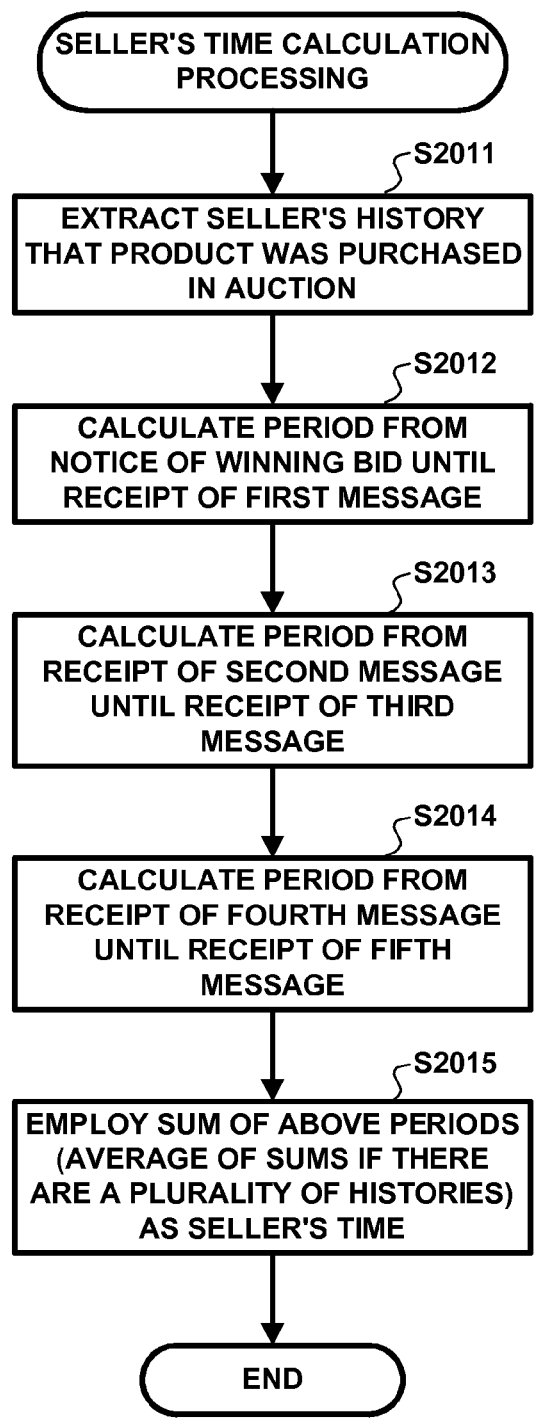
FIG. 8 is a flow chart for explaining seller's time calculation processing according to Embodiment 1.

The information generator 103 starts seller's time processing to determine a seller's time for a seller of a product specified by a bidder (Step S201, FIG. 8). For example, if the bidder Y requests the auction device 100 to present an expected period to dispatch the product "CCC", the information generator 103 starts seller's time processing for the seller X of the product "CCC".

The information generator 103 extracts, for a seller of a product of which an expected period to dispatch is required, a history of a product auctioned by the seller and purchased (Step S2011). For example, the information generator 103 extracts, a history that the product "AAA" auctioned by the seller X was purchased by the winning bidder Z, from the history table 102a in FIG. 5.

The information generator 103 determines the period 601 from a notice of winning bid until receipt of the first message on the basis of the extracted history (Step S2012). For example, the information generator 103 refers to the history table 102a to determine the period from the time and date when the seller X viewed a notice of winning bid (Nov. 1, 2010 at 00:00:00) until the time and date when the first message was received from the seller X (Nov. 1, 2010 at 00:30:00), that is, 30 minutes.

Next, the information generator 103 determines the period 603 from when the second message was received until the third message was received from the extracted history (Step S2013). For example, the information generator 103 refers to the history table 102a to determine the period from the time and date when the second message was received from the winning bidder Z (Nov. 1, 2010 at 08:30:00) until the time and date when the third message was received from the seller X (Nov. 1, 2010 at 18:00:00), that is, 9 hours and 30 minutes.

Then, the information generator 103 determines the period 605 from when the fourth message was received until the fifth message was received from the extracted history (Step S2014). For example, the information generator 103 refers to the history table 102a to determine the period from the time and date when the fourth message was received from the winning bidder Z (Nov. 1, 2010 at 20:30:00) until the time and date when the fifth message was received from the seller X (Nov. 3, 2010 at 10:00:00), that is, 37 hours and 30 minutes.

Finally, the information generator 103 determines a sum of the periods 601, 603 and 605 (an average of sums if a plurality of histories are extracted) as a seller's time (Step S2015). That is, the information generator 103 determines 47 hours and 30 minutes as a seller's time.

Figure 9:
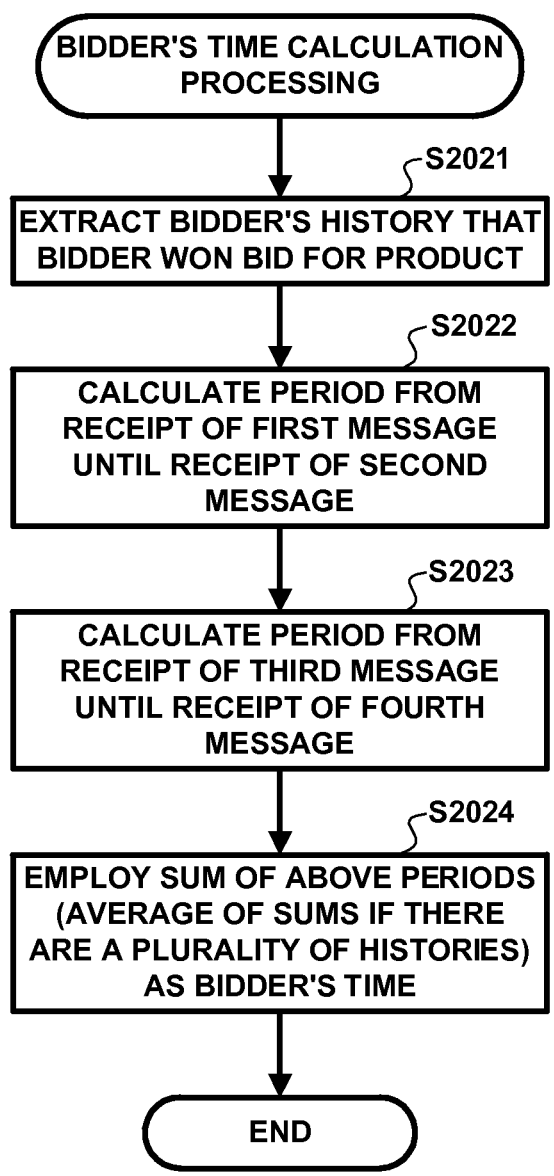
FIG. 9 is a flow chart for explaining bidder's time calculation processing according to Embodiment 1.

Next, the information generator 103 starts bidder's time processing to determine bidder's time of a bidder (Step S202, FIG. 9). For example, the information generator 103 starts bidder's time processing for the bidder Y that requested presentation of an expected period until dispatch of the product "CCC".

The information generator 103 extracts, for a bidder who requested an expected period until dispatch, a history of a product purchased by the bidder in an auction (Step S2021). For example, the information generator 103 extracts a history that the bidder Y won a bid for the product "BBB" from the history table 102a in FIG. 5.

The information generator 103 determines the period 602 from when the first message was received until the second message was received from the extracted history (Step S2022). For example, the information generator 103 refers to the history table 102a to determine the period from the time and date when the first message was received from the seller W (Nov. 1, 2010 at 01:00:00) until the time and date when the second message was received from the bidder Y (Nov. 1, 2010 at 03:00:00), that is, 2 hours.

Next, the information generator 103 determines the period 604 from when the third message was received until the fourth message was received from the extracted history (Step S2023). For example, the information generator 103 refers to the history table 102a to determine the period from the time and date when the third message was received from the seller W (Nov. 1, 2010 at 18:30:00) until the time and date when the fourth message was received from the bidder Y (Nov. 2, 2010 at 00:30:00), that is, 6 hours.

Finally, the information generator 103 determines a sum of the periods 602 and 604 (an average of sums if a plurality of histories are extracted) as the bidder's time (Step S2024). That is, the information generator 103 determines 8 hours as the bidder's time.

Once the seller's time and bidder's time have been determined, a sum of the seller's time and bidder's time is determined as an expected time until dispatch (Step S203). That is, the information generator 103 determines 55 hours and 30 minutes (47 hours and 30 minutes+8 hours) as an expected time until dispatch if the bidder Y wins a bid for the product "CCC" auctioned by the seller X.

Figure 7:
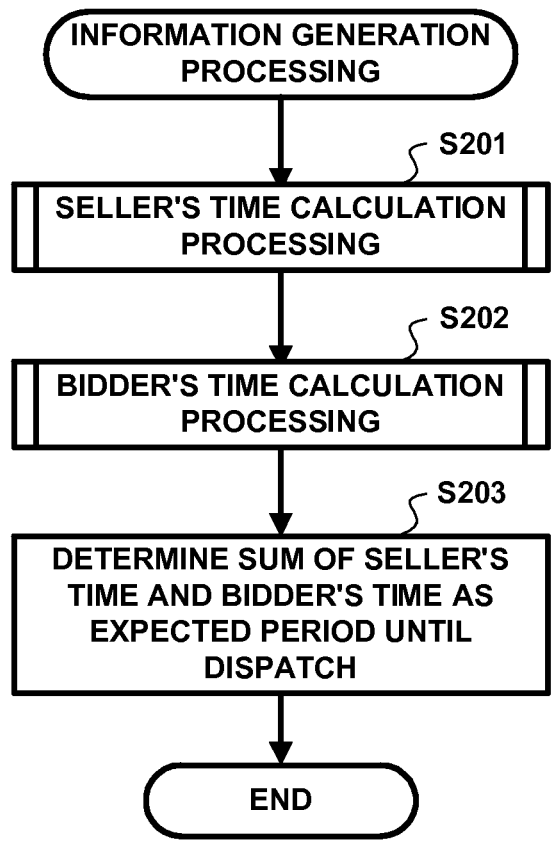
FIG. 7 is a flow chart for explaining information generation processing according to Embodiment 1.

In the flow chart in FIG. 7, Step S201 and Step S202 may be inversely performed.

In the present embodiment, before a product is purchased in an auction, an expected period until the product is dispatched to a winning bidder can be determined. Accordingly, a person who is considering bidding for or winning a bid for a product can be given an expected period until dispatch of the product, by referring to the expected period. Especially, since the aforementioned expected period can be determined for each combination of a seller and a bidder, the bidder can clearly know the period until the product arrives.

(4. Schematic Configuration of Auction Device According to Embodiment 2)

An auction device 100 according to Embodiment 2 stores a history of messages exchanged between a seller and a bidder after a bid is won in an auction, and determines an expected period that is required until a product arrives on the basis of the history before the product has been purchased.

The auction device 100 according to Embodiment 2 includes the message relay 101, the history storage 102 and the information generator 103, as illustrated in FIG. 3. The message relay 101 and the history storage 102 in the present embodiment have the same functions as those of Embodiment 1. Hereinafter, the information generator 103 having a different function will be described.

The information generator 103 determines an expected period that is required from when a not-yet purchased product is purchased by a winning bidder until the product arrives at the address of the winning bidder (hereinafter referred to as "expected period until arrival") based on a history stored in the history storage 102. Specifically, the information generator 103 estimates a seller's time and a bidder's time and determines a delivery time that is required from dispatch of the product until arrival of the product. Then, the information generator 103 calculates a sum of the seller's time, bidder's time and delivery time and determines the calculated sum as an expected period until arrival of the product. The information generator 103 determines the seller's time and bidder's time, as with Embodiment 1. The information generator 103 determines a delivery time on the basis of a seller's address, a bidder's address, and a delivery time information indicating time required for delivering a product from the sender's address to the destination address. Here, the sender's address is an address from which a product is dispatched; a destination address is an address to which a product is delivered; and a delivery time information is, for example, a delivery time table 102c (FIG. 11) shown below.

In the present embodiment, the CPU 501 functions as the information generator 103.

Hereinafter will be described a method in which the information generator 103 determines an expected period until arrival in the case where the bidder Y wins a bid for the product "CCC" auctioned by the seller X.

The information generator 103 refers to the history table 102a in FIG. 5 to calculate a seller's time for seller X and a bidder's time for bidder Y. Further, the information generator 103 refers to an address table 102b in FIG. 10 and the delivery table 102c in FIG. 11 to determine a delivery time from when the seller X dispatches a product until the product is delivered to the bidder Y. A method in which the information generator 103 determines a seller's time of the seller X and a bidder's time of the bidder Y is as described in Embodiment 1. Hereinafter, a method to determine a delivery time will be specifically described.

Here, in the address table 102b in FIG. 10, are registered "User ID 102b1" of participants (sellers or bidders) in a network auction and "Address 102b2" of the participants in association with each other.

In the delivery table 102c in FIG. 11, are registered "Sender's Address 102c1", "Destination Address 102c2" and "Delivery Time 102c3" indicating time required for delivery of a product from sender's address to destination address in association with each other.

The address table 102b in FIG. 10 and the delivery table 102c in FIG. 11 may be stored in the external memory 509 or the history storage 102 in the auction device 100, or may be stored in another device in such a way that the auction device 100 can refer to the address and delivery tables via the Internet 400.

The information generator 103, first, refers to the address table 102b in FIG. 10 to obtain the seller X's address "XXX-XXXX" from user ID "X" of the seller X, and the bidder Y's address "YYY-YYYY" from user ID "Y" of the bidder Y. Then, the information generator 103 specifies the seller X's address to sender's address, and the bidder Y's address to destination address thereby to determine a delivery time "2 days (48 hours)" based on the delivery table 102c in FIG. 11.

The information generator 103 calculates a sum of the seller's time "47 hours and 30 minutes" determined for the seller X, the bidder's time "8 hours" determined for the bidder Y and the delivery time "48 hours" to get "103 hours and 30 minutes" as an expected period until arrival if the bidder Y wins a bid for the product "CCC" auctioned by the seller X.

If the date when an expected period to dispatch (a sum of a seller's time of the seller X and a bidder's time of the bidder Y) has passed from a closing date of an auction of the product "CCC" auctioned by the seller X falls on a specific day of the week (Saturday, Sunday, holiday and the like), the information generator 103 may be able to determine an expected period until arrival where the product is dispatched on a day other than the specific day of the week. For example, assume that a "specific day of the week" is set to be "Saturday, Sunday, holiday" for the seller X, and a closing time and date of an auction falls on Thursday at 00:00:00. In this case, for example, the time from 07:30 on Saturday to 00:00 on Monday ("40 hours and 30 minutes") is made to be included in an expected period until arrival. That is, the information generator 103 calculates a sum of the seller's time of the seller X "47 hours and 30 minutes", the bidder's time of the bidder Y "8 hours", the delivery time "48 hours" and "40 hours 30 minutes" to get "144 hours" as an expected period until arrival. This enables an expected period until arrival that reflects a seller's convenience to be taken into account even if the seller has an inconvenient day to dispatch (specific day of the week).

(5. Operation of Auction Device According to Embodiment 2)

Figure 12:
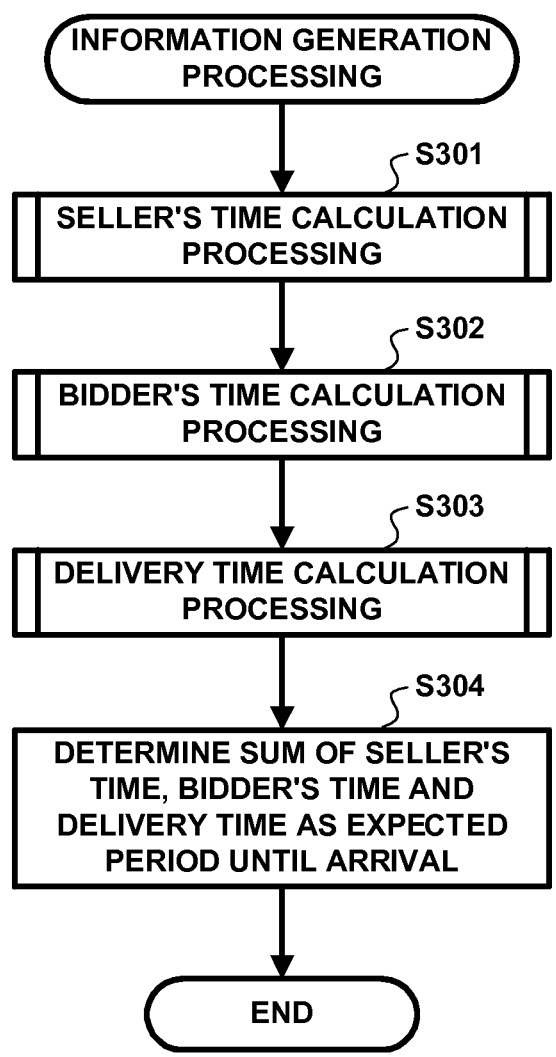
FIG. 12 is a flow chart for explaining information generation processing according to Embodiment 2.

Hereinafter, information generation processing performed by each part of the auction device 100 will be described with reference to the flow chart in FIG. 12. When a bidder requests the auction device 100 to present an expected period until arrival of a product, the CPU 501 starts information generation processing illustrated in the flow chart in FIG. 12. Processing in Step S301 of the flow chart in FIG. 12 is the same as that of Step S201 (seller's time calculation processing, FIG. 8) in the flow chart of FIG. 7, and processing in Step S302 of the flow chart in FIG. 12 is the same as that of Step S202 (bidder's time calculation processing, FIG. 9) in the flow chart of FIG. 7. Accordingly, the processing in Steps S301 and 302 will not be described. Hereinafter, will be described, as an example, a case in which the bidder Y requests the auction device 100 to present an expected period until arrival of the product "CCC" auctioned by the seller X.

Figure 13:
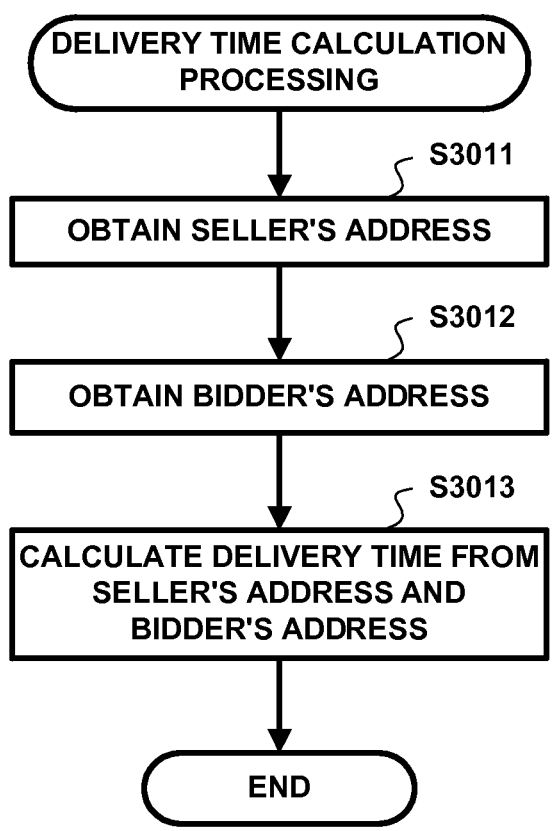
FIG. 13 is a flow chart for explaining delivery time calculation processing according to Embodiment 2.

Once a bidder's time has been calculated at Step S302, the information generator 103 next starts delivery time calculation processing (Step S303, FIG. 13).

The information generator 103 refers to the address table 102b in FIG. 10 to obtain seller's address (Step S3011). That is, the information generator 103 obtains address "XXX-XXXX" of the seller X from user ID "X" of the seller X.

Next, the information generator 103 refers to the address table 102b in FIG. 10 to obtain bidder's address (Step S3012). That is, the information generator 103 obtains address "YYY-YYYY" of the bidder Y from user ID "Y" of the bidder Y.

Then, the information generator 103 refers to the delivery table 102c in FIG. 11 to calculate a delivery time (Step S3013). For example, the information generator 103 specifies the seller X' address "XXX-XXXX" to be sender's address, and the bidder Y's address "YYY-YYYY" to be destination address thereby to determine a delivery time "2 days (48 hours)".

Once a delivery time has been determined at Step S303, the information generator 103 determines a sum of the seller's time, bidder's time and delivery time as an expected time for arrival of a product (Step S304). That is, the information generator calculates a sum of the seller's time "47 hours and 30 minutes", bidder's time "8 hours" and delivery time "2 days (48 hours)" to get "103 hours and 30 minutes" as an expected period until arrival of the product "CCC" auctioned by the seller X.

In the flow chart of FIG. 13, Step S3011 and Step S3012 may be inversely performed.

In the present embodiment, before a product is purchased, if the product is purchased by a winning bidder, an expected period until the product arrives at the winning bidder's address can be determined. Therefore, a person that is considering bidding for or winning a bid for a product can know an expected period for arrival of the product, by referring to the expected period.

(6. Schematic Configuration of Auction Device According to Embodiment 3)

An auction device 100 according to Embodiment 3 presents an expected period that is required until a product arrives, in response to a request from a person who is considering bidding for a product.

Figure 14:
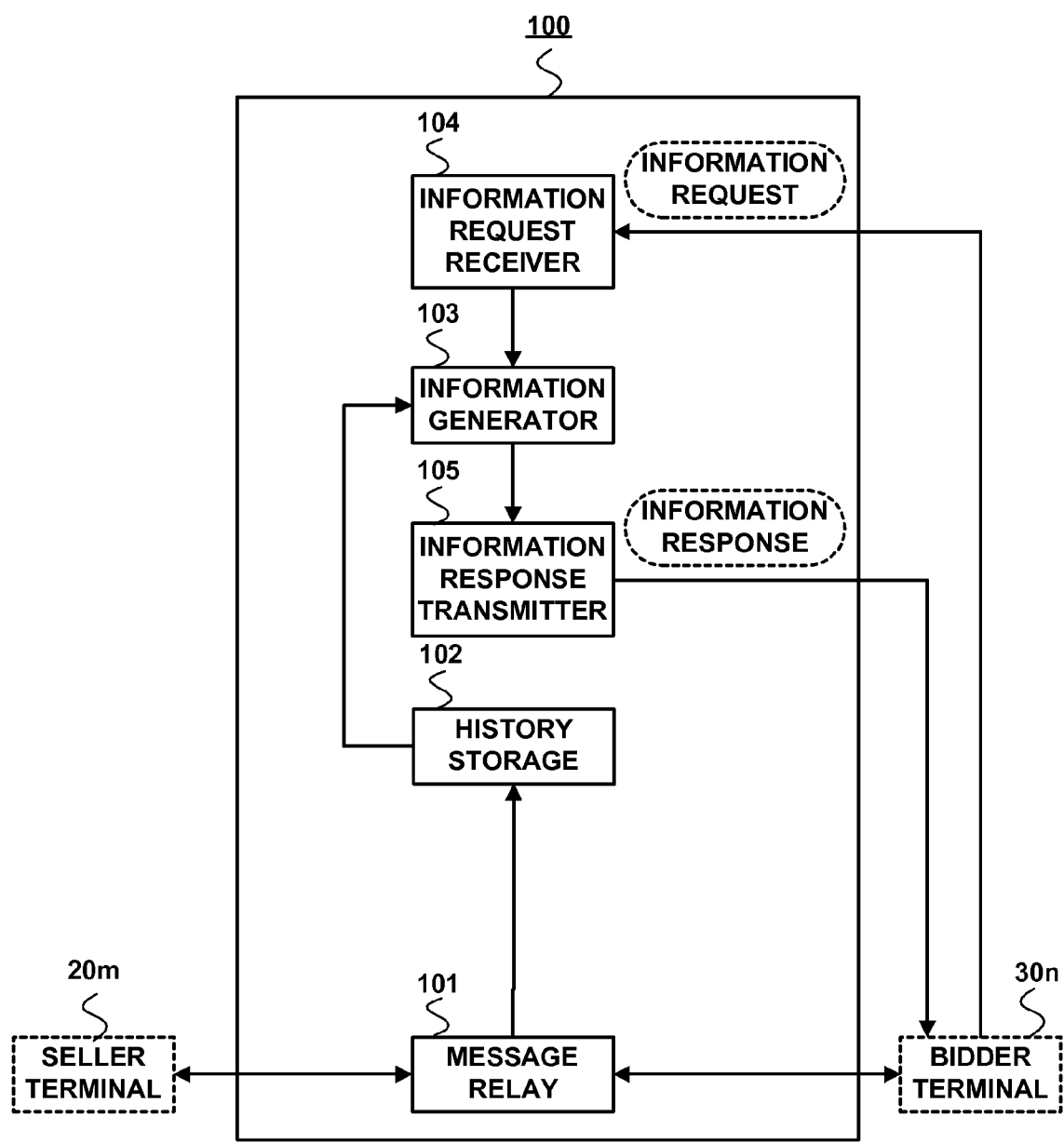
FIG. 14 is a diagram illustrating a schematic configuration of an auction device according to Embodiment 3.

The auction device 100 according to Embodiment 3 includes the message relay 101, the history storage 102, the information generator 103, an information request receiver 104 and an information response transmitter 105, as illustrated in FIG. 14. The message relay 101 and history storage 102 in the present embodiment have the same functions as those of Embodiment 1. The information generator 103 in the present embodiment has the same function as that of Embodiment 2. Hereinafter, the information request receiver 104 and information response transmitter 105 that have different functions will be described.

The information request receiver 104 receives an information request sent from a bidder terminal 30n. Here, an information request is, for example, a request for an expected period until arrival of a product for which a bidder is considering bidding. The information request includes user ID of a bidder who sent the request, and information that identifies a product specified by the bidder (product name and/or the like).

In the present embodiment, the CPU 501 and NIC 504 work together to function as the information request receiver 104.

The information response transmitter 105 sends an information response to a bidder terminal 30n that sent an information request. Here, an information response includes an expected period until arrival of a product specified by an information request, for example. That is, the information response transmitter 105 sends an information response to a bidder terminal 30n that sent an information request, the information response including an expected period until arrival requested by the information generator 103.

In the present embodiment, the CPU 501 and NIC 504 work together to function as the information response transmitter 105.

FIG. 15 illustrates an example of information of an information response displayed on a monitor of a bidder terminal 30n when the information response is received by the bidder terminal 30n. In the following example, the auction device 100 sends an information response that includes an expected period until arrival, as well as information about product bidding (for example, the current bidding price and the number of bidding), to a bidder terminal 30n.

Once a bidder terminal 30n has received an information response, a search result table 300a is displayed on a monitor. To the search result table 300a are registered "Image 300a1" of a product specified by an information request of a bidder, "Product Name 300a2" of the product, "Current Bidding Price 300a3" of the product, "Immediate Successful Bidding Price 300a4" of the product, "Number of Bidding 300a5" for the product, "Remaining Time 300a6" until end of auction of the product, and "Predicted Period Until Arrival 300a7" included in an information response in association with each other. Here, an immediate successful bidding price is the bidding price at which a bid for a product is won and the auction ends.

For example, if the information request receiver 104 receives an information request for an expected period until arrival of the product "CCC" from the bidder Y, the information generator 103 selects the product "CCC" that can be bid for from products on a network auction, and determines an expected period until arrival for the selected product "CCC". Then, the information response transmitter 105 sends an information response that includes the expected period until arrival to a bidder terminal 30n of the bidder Y. Hereinafter, assume that there are five products "CCC" (products 701 to 705 in FIG. 15) that can be bid for on a network auction. The information generator 103 determines expected periods of arrival of all of the selected products 701 to 705. For example, if a seller of the product 701 is X, the information generator 103 determines a seller's time of the seller X, a bidder's time of the bidder Y, and a delivery time determined from seller X's address and bidder Y's address, as described in Embodiment 2, thereby determining an expected period until arrival. Similarly, the information generator 103 determines a seller's time of each seller of the products 702 to 705, the bidder's time of the bidder Y, and a delivery time found from each seller's address and the bidder Y's address, thereby determining an expected period until arrival of each of the products 702 to 705. The information response transmitter 105 can sort the products 701 to 705 in ascending order of expected period until arrival, as illustrated in FIG. 15 and send the information response to a bidder terminal 30n.

The information request receiver 104 may receive an information request that specifies a bidder's desired arrival time and date of a product. For example, assume that the bidder Y sends an information request on the product "CCC" that can arrive at the bidder Y within 6 days. In this case, the information response transmitter 105 sends, as an information response, a list of products that arrive until an arrival time and date specified by the bidder. For example, in an example in FIG. 15, the information response transmitter 105 may select products 701, 702 whose expected period until arrival is shorter than 6 days (144 hours=6×24), and sends a list of products 701, 702, as an information response.

(7. Operation of Auction Device According to Embodiment 3)

Figure 16:
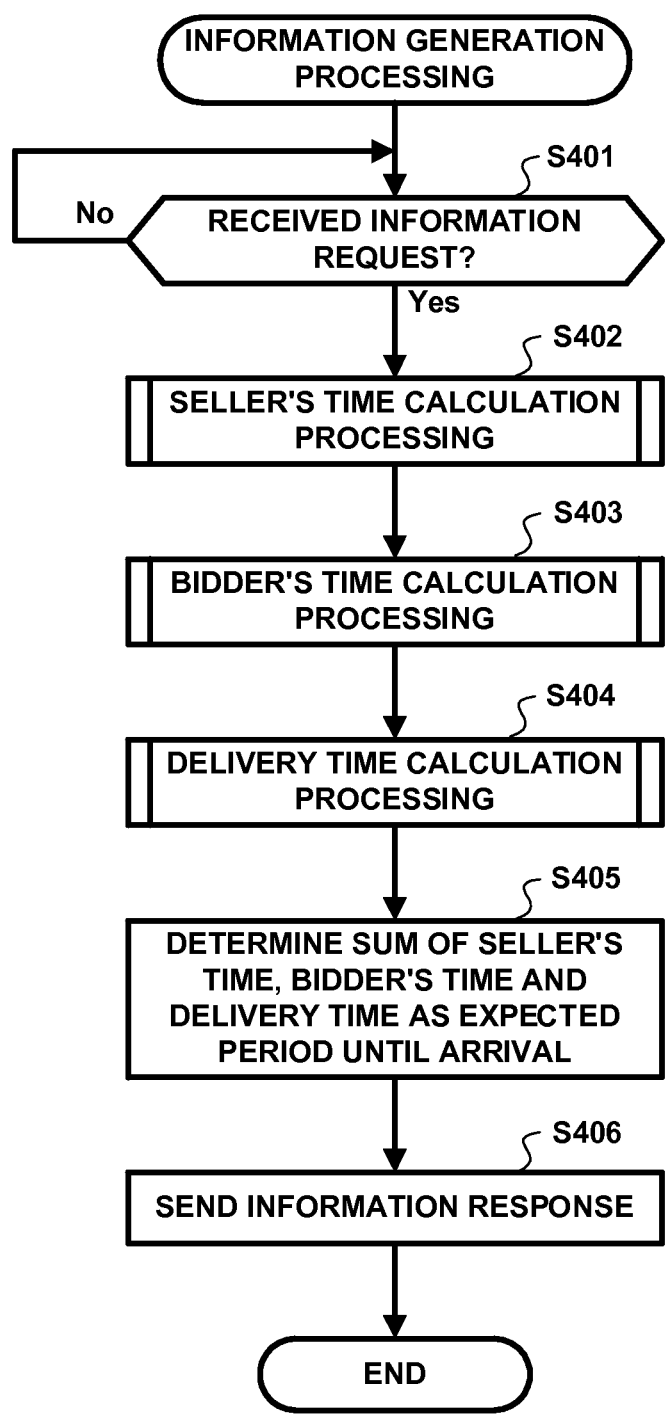
FIG. 16 is a flow chart for explaining information generation processing according to Embodiment 3.

Hereinafter, information generation processing performed by each part of the auction device 100 will be described with reference to the flow chart in FIG. 16. Once the auction device 100 has been turned on, the CPU 501 starts information generation processing illustrated in the flow chart in FIG. 16. Processing at Step S402 of the flow chart in FIG. 16 is the same as that of Step S201 (seller's time calculation processing, FIG. 8) of the flow chart in FIG. 7; processing at Step S403 is the same as that of Step S202 (bidder's time calculation processing, FIG. 9) of the flow chart in FIG. 7, and processing at Step S404 is the same as that of Step S303 (delivery time calculation processing, FIG. 13) of the flow chart in FIG. 12. Accordingly, processing at Steps S402, S403, and S404 will not be described. Hereinafter, will be described a case in which the bidder Y requests the auction device 100 to present an expected period until arrival of the product "CCC", as an example.

The information request receiver 104 determines whether it has received an information request from a bidder terminal 30n (Step S401). If the information request receiver 104 determines it has received an information request (Step S401; Yes), the information generator 103 starts seller's time calculation processing (Step S402, FIG. 8). Then, the information generator 103 sequentially starts bidder's time calculation processing (Step S403, FIG. 9) and delivery time calculation processing (Step S404, FIG. 13). Meanwhile, if the information request receiver 104 determines it has not received an information request (Step S401; No), the information request receiver 104 stands by. For example, if the information request receiver 104 receives an information request for an expected period until arrival of the product "CCC" from a bidder terminal 30n of the bidder Y, the information generator 103 determines a seller's time of a seller of the product "CCC" for which he can bid. Further, the information generator 103 determines a bidder's time of the bidder Y, and determines a delivery time from each seller's address and the bidder Y's address.

At Step S405, a sum of the seller's time, bidder's time and delivery time, that is, an expected period until arrival of the product is determined for the product specified by the information request. Then, the information response transmitter 105 sends the expected period until arrival as an information response to the bidder terminal 30n that sent the information request. For example, the information response transmitter 105 sends an information response that includes expected periods of arrival of the products 701 to 705 to the bidder terminal 30n of the bidder Y.

In the present embodiment, a person that is considering bidding or winning a bid can understand the time and date when a product arrives if the product is purchased, before the product is purchased. In addition, since product information can be sorted by the earliest time and date of arrival of a product, a product whose arrival time and date is early can be selected and purchased by bidding. If a product is to be received by a specific time and date, only a product that can arrive by the specific time and date can be referred to.

In the present embodiment, the information request receiver 104 receives a request for an expected period until arrival of a product, but without being limited to this, may receive a request for a expected dispatch period of a product. In such a case, the information generator 103 determines an expected dispatch period of a product for which he/she can bid, and the information response transmitter 105 sends the expected dispatch period as an information response to a bidder terminal.

(8. Schematic Configuration of Auction Device According to Embodiment 4)

An auction device 100 according to Embodiment 4 presents an expected period that is required until arrival of a product on the basis of a specified period.

Figure 17:
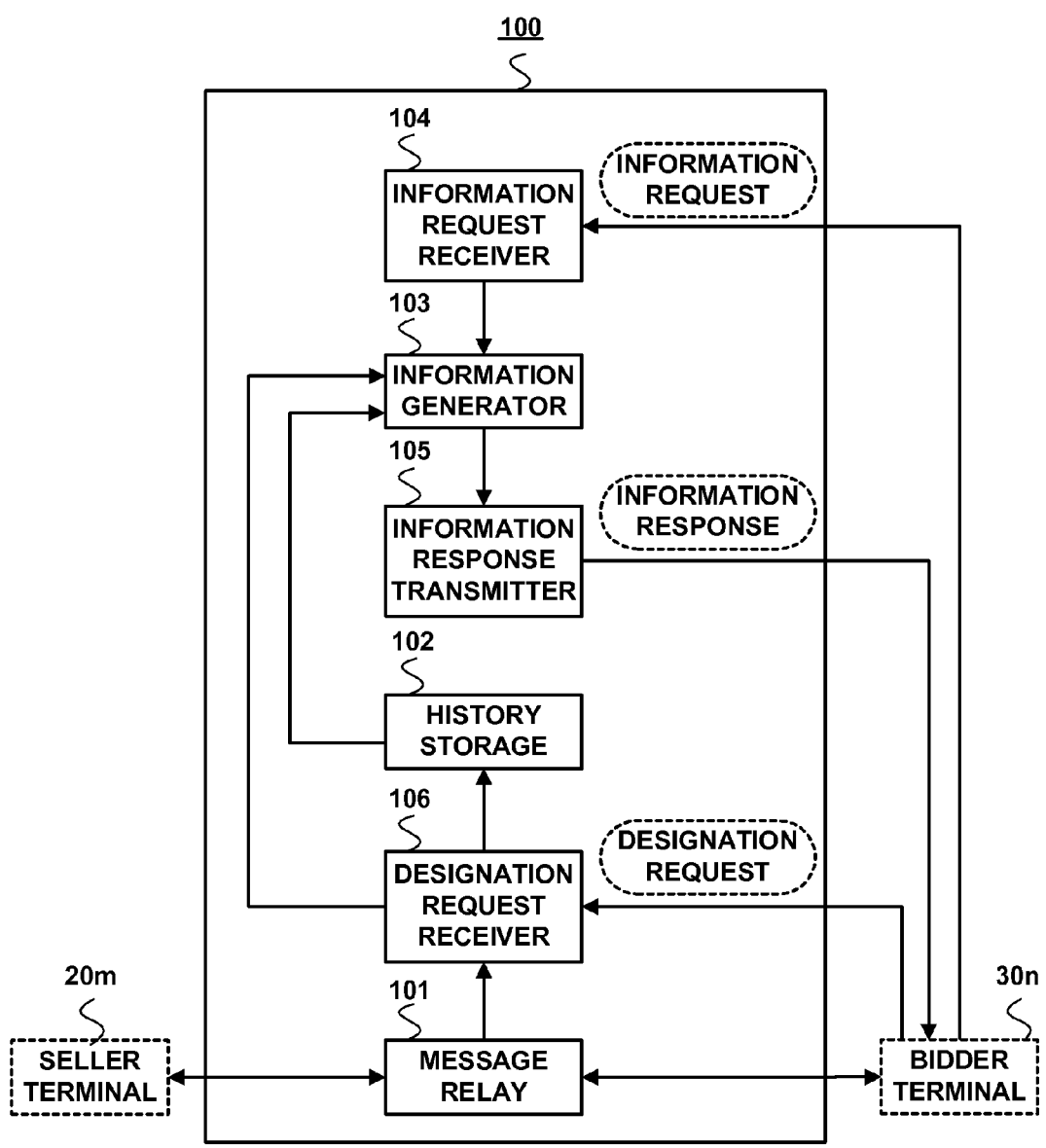
FIG. 17 is a diagram illustrating a schematic configuration of an auction device according to Embodiment 4.

The auction device 100 according to Embodiment 4 includes the message relay 101, the history storage 102, the information generator 103, the information request receiver 104, the information response transmitter 105 and a designation request receiver 106, as illustrated in FIG. 17. The message relay 101 and history storage 102 in the present embodiment have the same functions as those of Embodiment 1. The information request receiver 104 and information response transmitter 105 in the present embodiment have the same functions as those of Embodiment 3. Hereinafter, the information generator 103 and the designation request receiver 106 that have different functions will be described.

The designation request receiver 106 receives a designation request that specifies a bidder's time from a bidder terminal 30n.

In the present embodiment, the CPU 501 and NIC 504 work together to function as the designation request receiver 106.

The information generator 103 has the following function, in addition to the function described in Embodiment 2.

If the designation request receiver 106 receives a designation request, the information generator 103 determines an expected period until arrival from a bidder's time specified by the designation request. That is, the information generator 103 does not determine a bidder's time from the history, but uses the specified bidder's time to determine an expected period until arrival.

In the present embodiment, the CPU 501 functions as the information generator 103.

(9. Operation of Auction Device According to Embodiment 4)

Figure 18:
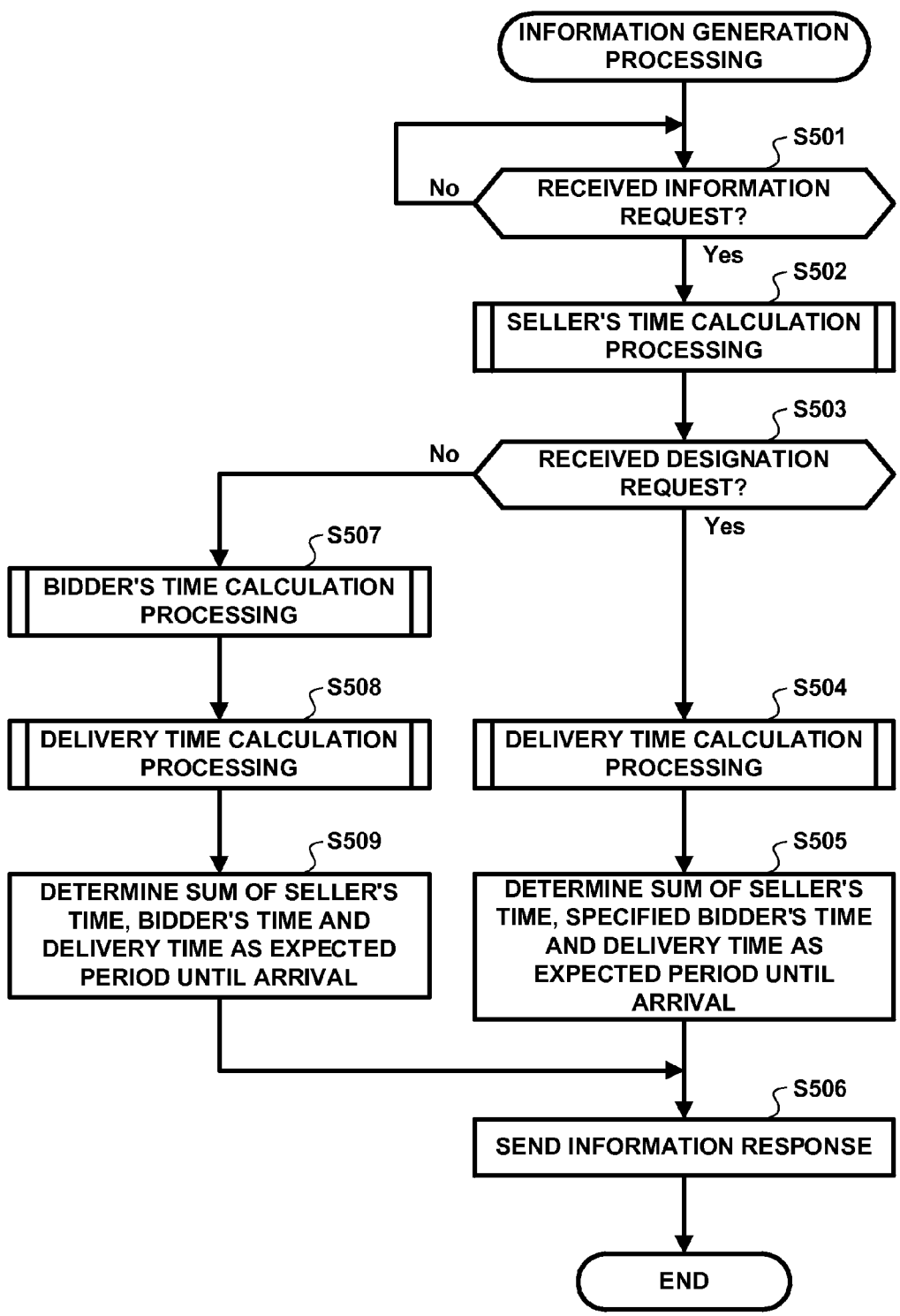
FIG. 18 is a flow chart for explaining information generation processing according to Embodiment 4.

Hereinafter, information generation processing performed by each part of an auction device 100 will be described with reference to the flow chart in FIG. 18. Once the auction device 100 has been turned on, the CPU 501 starts information generation processing illustrated in the flow chart in FIG. 18. Processing at Step S501 in the flow chart of FIG. 18 is the same as that of Step S401 in FIG. 16; processing at Step S502 is the same as that of Step S201 (seller's time calculation processing, FIG. 8) in the flow chart of FIG. 7; processing at Step S507 is the same as that of Step S202 (bidder's time calculation processing, FIG. 9) in the flow chart of FIG. 7; and processing at Steps S504 and S508 is the same as that of Step S303 (delivery time calculation processing, FIG. 13) in the flow chart of FIG. 12. Accordingly, processing at these steps will not be described. Hereinafter, will be described a case in which the bidder Y requests the auction device 100 to present an expected period until arrival of the product "CCC", as an example.

After the information generator 103 calculates a seller's time (Step S502), the designation request receiver 106 determines whether it has received a designation request (Step S503). If the designation request receiver 106 determines it has received a designation request (Step S503; Yes), the information generator 103 starts delivery time calculation processing (Step S504). Then, the information generator 103 calculates a sum of a calculated seller's time, a bidder's time specified by a designation request and a calculated delivery time, and determines the sum as an expected period until arrival (Step S505).

Meanwhile, if the designation request receiver 106 determines it has not received a designation request (Step S503; No), the information generator 103 starts processing to calculate a bidder's time for a bidder who sent an information request (Step S507), and then delivery time calculation processing (Step S508). Then, the information generator 103 calculates a sum of the calculated seller's time, bidder's time and delivery time (Step S509).

Once an expected period until arrival has been found (Step S505 or Step S509), the information response transmitter 105 sends an information response that includes the expected period until arrival to the bidder terminal 30n.

For example, assume that the bidder Y sets a bidder's time to be "48 hours (2 days)" and sends information of the bidder's time (a designation request) to the auction device 100, and the designation request receiver 106 receives the designation request. In this case, the information generator 103 calculates a sum of a seller's time (for example "47 hours and 30 minutes") determined from the history table 102a, the specified bidder's time ("48 hours") and a delivery time (for example "48 hours") determined from the delivery time table 102c to get "143 hours and 30 minutes" as an expected period until arrival. Meanwhile, if the bidder Y does not send a bidder's time (a designation request), the information generator 103 calculates a sum of a seller's time (for example "47 hours and 30 minutes") and a bidder's time (for example, "8 hours") that are determined from the history table 102a and a delivery time (for example "48 hours") determined from the delivery time table 102c to get "103 hours and 30 minutes" as an expected period until arrival. Once either of the expected periods of arrival has been determined, the information response transmitter 105 sends an information response that includes the determined expected period until arrival to a bidder terminal 30n.

In the present embodiment, an expected period until arrival of a product can be determined on the basis of a period specified by a bidder, thereby variably determining an expected period until arrival at a bidder's convenience.

In the present embodiment, the information generator 103 determines an expected period until arrival of a product, but without limitation to this, may determine an expected dispatch period of a product in response to an information request.

In the above embodiment, the auction device 100 determines an expected period that is required until dispatch or arrival of a product and presents the expected period to a bidder, but is not limited to this. For example, the auction device 100 may determine only a seller's time in response to a request from a bidder, and present the seller's time to the bidder. For example, the information request receiver 104 receives, from a bidder terminal 30n, an information request for a seller's time of a seller of a product for which a bidder who operates the bidder terminals 30n is considering bidding. Then, the information response transmitter 105 sends an information response that includes a seller's time determined by the information generator 103 to the bidder terminal 30n that sent the information request. This enables the bidder to know the time that is required by a seller from when the product has been purchased until the product is dispatched.

Or, for example, the auction device 100 may determine only a bidder's time of a bidder in response to a request from a seller, and present the bidder's time to the seller. For example, the information request receiver 104 receives, from a seller terminal 20m, an information request for a bidder's time of a bidder of a product auctioned by a seller who operates the seller terminal 20m. Then, the information response transmitter 105 sends an information response that includes a bidder's time determined by the information generator 103 to the seller terminals 20m that sent the information request. This enables the seller to know the time that is required by the bidder from when the product has been purchased until the product is dispatched. Generally, an auction device sets a top bidder to be a winning bidder, but may consider, for example, not only a bidding price but also a bidder's time to set conditions for winning a bid to the auction device.

The present invention is based on Japanese Patent Application No. 2010-265560 filed on Nov. 29, 2010. The entire specification, claims and drawings of Japanese Patent Application No. 2010-265560 are incorporated herein by reference.

INDUSTRIAL APPLICABILITY

The present invention can provide an auction device that is suitable for understanding before bidding or a winning bid, the time that is required for exchange between a bidder and a seller, a control method for the auction device, a program and a non-transitory information recording medium.

REFERENCE SIGNS LIST

100 Auction device
101 Message relay
102 History storage
103 Information generator
104 Information request receiver
105 Information response transmitter
106 Designation request receiver
201, 202 to 20M Seller terminal
301, 302 to 30N Bidder terminal
400 Internet
500 Information processor
501 CPU
502 ROM
503 RAM
504 NIC
505 Image processor
506 Voice processor
507 DVD-ROM drive
508 Interface
509 External memory
510 Controller
511 Monitor
512 Speaker
601, 602, 603, 604, 605 Period
701, 702, 703, 704, 705 Product

The invention claimed is:

1. An auction device communicably connected to seller terminals, each being used by a seller who sells a product in an auction and bidder terminals, each being used by a bidder who is going to bid on a product in the auction, the auction device comprising:

a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;

a history storage configured to store a history of the relayed messages; and an information generator configured to
estimate, based on a history of the seller stored in the history storage, a seller's time that is required by the seller, for a period from when a not-yet purchased product is purchased until the product is dispatched,
estimate, based on a history of the bidder stored in the history storage, a bidder's time that is required by the bidder, for the period from when the not-yet purchased product is purchased until the product is dispatched, and
determine an expected period that is required from when the not-yet purchased product is purchased until the product is dispatched, wherein the message relay, after the product is purchased, (1) receives a first message addressed to the winning bidder from the seller terminal that is used by the seller, the first message inquiring about an address of the winning bidder and a preferred payment method, and relays the first message to the bidder terminal, (2) receives a second message addressed to the seller from the bidder terminal, the second message informing the seller of the address of the winning bidder and the preferred payment method, and relays the second message to the seller terminal, (3) receives a third message addressed to the winning bidder from the seller terminal, the third message informing the winning bidder of a payment amount for the auction, and relays the third message to the bidder terminal, (4) receives a fourth message addressed to the seller from the bidder terminal, the fourth message informing the seller that payment has been completed, and relays the fourth message to the seller terminal, (5) receives a fifth message addressed to the winning bidder from the seller terminal, the fifth message informing the winning bidder that the product has been dispatched, and relays the fifth message to the bidder terminal, and (6) receives a sixth message addressed to the seller from the bidder terminal, the sixth message informing the seller that the product has arrived, and relays the sixth message to the seller terminal, and wherein the information generator calculates, for each of auctions at which the seller sold a product, a sum of time from when the product was purchased until receipt of the first message, time from receipt of the second message until receipt of the third message, and time from receipt of the fourth message until receipt of the fifth message, and estimates that an average of the calculated sums for the auctions is the seller's time, calculates, for each of auctions at which the bidder won a bid on a product, a sum of time from receipt of the first message until receipt of the second message and time from receipt of the third message until receipt of the fourth message, and estimates that an average of the calculated sums for the auctions is the bidder's time, and calculates a sum of the estimated seller's time and the estimated bidder's time, and employs the calculated sum as the expected period that is required from when the not-yet purchased product is purchased until the product is dispatched.

2. An auction device communicably connected to seller terminals, each being used by a seller who sells a product in an auction and bidder terminals, each being used by a bidder who is going to bid on a product in the auction comprising:

a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;

a history storage configured to store a history of the relayed messages; and an information generator configured to estimate, based on a history of the seller stored in the history storage, a seller's time that is required by the seller, for a period from when a not-yet purchased product is purchased until the product is dispatched, wherein the message relay, after the product is purchased, (1) receives a first message addressed to the winning bidder from the seller terminal that is used by the seller, the first message inquiring about an address of the winning bidder and a preferred payment method, and relays the first message to the bidder terminal, (2) receives a second message addressed to the seller from the bidder terminal, the second message informing the seller of the address of the winning bidder and the preferred payment method, and relays the second message to the seller terminal, (3) receives a third message addressed to the winning bidder from the seller terminal, the third message informing the winning bidder of a payment amount for the auction, and relays the third message to the bidder terminal, (4) receives a fourth message addressed to the seller from the bidder terminal, the fourth message informing the seller that payment has been completed, and relays the fourth message to the seller terminal, and (5) receives a fifth message addressed to the winning bidder from the seller terminal, the fifth message informing the winning bidder that the product has been dispatched, and relays the fifth message to the bidder terminal, and wherein the information generator calculates, for each of auctions at which the seller sold a product, a sum of time from when the product was purchased until receipt of the first message, time from receipt of the second message until receipt of the third message, and time from receipt of the fourth message until receipt of the fifth message, and estimates that an average of the calculated sums for the auctions is the seller's time.

3. The auction device according to claim 2, wherein the information generator further estimates that another sum of time from when the product was purchased until receipt of the first message, time from receipt of the second message until receipt of the third message, and time from receipt of the fourth message until receipt of the fifth message is another seller's time, the another sum being calculated based on the latest history that is stored in the history storage and relates to one of the auctions at which the seller sold a product.

4. The auction device according to claim 2, further comprising:

an information request receiver configured to receive an information request sent from the bidder terminal; and an information response transmitter configured to send an information response to the bidder terminal that sent the information request, wherein the information generator estimates a seller's time of a product of the information request, and wherein the information response transmitter sends the seller's time of the product of the information request as the information response.

5. The auction device according to claim 2, wherein the information generator determines, based on the history stored in the history storage, an expected period that is required from when the not-yet purchased product is purchased until the product is dispatched, calculates, for each of auctions at which the bidder won a bid on a product, a sum of time from receipt of the first message until receipt of the second message and time from receipt of the third message until receipt of the fourth message based on a history of the bidder stored in the history storage, and estimates that an average of the calculated sums for the auctions is the bidder's time, the bidder's time being required by the bidder, for the period from when the not-yet purchased product is purchased until the product is dispatched, and calculates a sum of the estimated seller's time and the estimated bidder's time, and employs the calculated sum as the expected period that is required from when the not-yet purchased product is purchased until the product is dispatched.

6. The auction device according to claim 5, wherein the information generator further estimates that another sum of time from receipt of the first message until receipt of the second message and time from receipt of the third message until receipt of the fourth message is another bidder's time, the another sum being calculated based on the latest history that is stored in the history storage and relates to one of the auctions at which the bidder won a bid on a product.

7. The auction device according to claim 5, wherein the information generator determines a delivery time that is required from a dispatch of the product to arrival of the product on the basis of an address of the seller and an address of the bidder, and delivery time information that indicates time required for delivering a product from a sender's address to a destination address, and calculates a sum of the seller's time, the bidder's time and the delivery time, and employs the calculated sum as an expected period that is required from when the product is purchased until the product arrives.

8. The auction device according to claim 5, further comprising:
an information request receiver configured to receive an information request sent from the bidder terminal; and
an information response transmitter configured to send an information response to the bidder terminal that sent the information request,
wherein the information generator determines the expected period of a product of the information request, and
wherein the information response transmitter sends the expected period of the product of the information request as the information response.

9. The auction device according to claim 5, further comprising a designation request receiver configured to receive a designation request to specify a bidder's time from the bidder terminal,
wherein the information generator, if the designation request is received, calculates the sum using the specified bidder's time instead of the estimated bidder's time.

10. An auction device communicably connected to seller terminals, each being used by a seller who sells a product in an auction and bidder terminals, each being used by a bidder who is going to bid on a product in the auction, the auction device comprising:
a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;
a history storage configured to store a history of the relayed messages; and
an information generator configured to estimate, based on a history of the bidder stored in the history storage, a bidder's time that is required by the bidder, for a period from when a not-yet purchased product is purchased until the product is dispatched,
wherein the message relay, after the product is purchased,
(1) receives a first message addressed to the winning bidder from the seller terminal that is used by the seller, the first message inquiring about an address of the winning bidder and a preferred payment method, and relays the first message to the bidder terminal,
(2) receives a second message addressed to the seller from the bidder terminal, the second message informing the seller of the address of the winning bidder and the preferred payment method, and relays the second message to the seller terminal,
(3) receives a third message addressed to the winning bidder from the seller terminal, the third message informing the winning bidder of a payment amount for the auction, and relays the third message to the bidder terminal, and
(4) receives a fourth message addressed to the seller from the bidder terminal, the fourth message informing the seller that payment has been completed, and relays the fourth message to the seller terminal, and
wherein the information generator calculates, for each of auctions at which the bidder won a bid on a product, a sum of time from receipt of the first message until receipt of the second message and time from receipt of the third message until receipt of the fourth message, and estimates that an average of the calculated sums for the auctions is the bidder's time.

11. The auction device according to claim 10, further comprising
an information request receiver configured to receive an information request sent from the seller terminal; and
an information response transmitter configured to send an information response to the seller terminal that sent the information request,
wherein the information generator estimates a bidder's time for a product of the information request, and
wherein the information response transmitter sends the bidder's time for the product of the information request as the information response.

12. A control method performed by an auction device, the auction device communicably connected to seller terminals, each being used by a seller who sells a product in an auction and bidder terminals, each being used by a bidder who is going to bid on a product in the auction, the auction device comprising a message relay, a history storage configured to store a history of relayed messages and an information generator, the control method comprising:
in response to a product in the auction being purchased, a message relay relaying messages about sale and purchase of the product exchanged between a seller of the product and a bidder who is the winning bidder of the product, between a seller terminal used by the seller and a bidder terminal used by the winning bidder; and
estimating, by an information generator, based on a history of the seller stored in the history storage, a seller's time that is required by the seller, for a period from when a not-yet purchased product is purchased until the product is dispatched,
estimating, by the information generator, based on a history of the bidder stored in the history storage, a bidder's time that is required by the bidder, for the period from when the not-yet purchased product is purchased until the product is dispatched, and
determining, by the information generator, an expected period that is required from when the not-yet purchased product is purchased until the product is dispatched;
in response to purchase of the product, the message relay,
(1) receives a first message addressed to the winning bidder from the seller terminal that is used by the seller, the first message inquiring about an address of the winning bidder and a preferred payment method, and relays the first message to the bidder terminal,
(2) receives a second message addressed to the seller from the bidder terminal, the second message informing the seller of the address of the winning bidder and the preferred payment method, and relays the second message to the seller terminal,
(3) receives a third message addressed to the winning bidder from the seller terminal, the third message informing the winning bidder of a payment amount for the auction, and relays the third message to the bidder terminal,
(4) receives a fourth message addressed to the seller from the bidder terminal, the fourth message informing the seller that payment has been completed, and relays the fourth message to the seller terminal,
(5) receives a fifth message addressed to the winning bidder from the seller terminal, the fifth message informing the winning bidder that the product has been dispatched, and relays the fifth message to the bidder terminal, and
(6) receives a sixth message addressed to the seller from the bidder terminal, the sixth message informing the seller that the product has arrived, and relays the sixth message to the seller terminal, and the information generator further calculates, for each of auctions at which the seller sold a product, a sum of time from when the product was purchased until receipt of the first message, time from receipt of the second message until receipt of the third message, and time from receipt of the fourth message until receipt of the fifth message, and estimates that an average of the calculated sums for the auctions is the seller's time, calculates, for each of auctions at which the bidder won a bid on a product, a sum of time from receipt of the first message until receipt of the second message and time from receipt of the third message until receipt of the fourth message, and estimates that an average of the calculated sums for the auctions is the bidder's time, and calculates a sum of the estimated seller's time and the estimated bidder's time, and employs the calculated sum as the expected period that is required from when the not-yet purchased product is purchased until the product is dispatched.

13. A control method performed by an auction device, the auction device communicably connected to seller terminals, each being used by a seller who sells a product in an auction and bidder terminals, each being used by a bidder who is going to bid on a product in the auction, the auction device comprising a message relay, a history storage configured to store a history of relayed messages and an information generator, the control method comprising:

in response to a product in the auction being purchased, a message relay relaying messages about sale and purchase of the product exchanged between a seller of the product and a bidder who is the winning bidder of the product, between a seller terminal used by the seller and a bidder terminal used by the winning bidder; and estimating, by an information generator, based on a history of the seller stored in the history storage, a seller's time that is required by the seller, for a period from when a not-yet purchased product is purchased until the product is dispatched;

in response to purchase of the product, the message relay, (1) receives a first message addressed to the winning bidder from the seller terminal that is used by the seller, the first message inquiring about an address of the winning bidder and a preferred payment method, and relays the first message to the bidder terminal, (2) receives a second message addressed to the seller from the bidder terminal, the second message informing the seller of the address of the winning bidder and the preferred payment method, and relays the second message to the seller terminal, (3) receives a third message addressed to the winning bidder from the seller terminal, the third message informing the winning bidder of a payment amount for the auction, and relays the third message to the bidder terminal, (4) receives a fourth message addressed to the seller from the bidder terminal, the fourth message informing the seller that payment has been completed, and relays the fourth message to the seller terminal, and (5) receives a fifth message addressed to the winning bidder from the seller terminal, the fifth message informing the winning bidder that the product has been dispatched, and relays the fifth message to the bidder terminal, and the information generator further calculates, for each of auctions at which the seller sold a product, a sum of time from when the product was purchased until receipt of the first message, time from receipt of the second message until receipt of the third message, and time from receipt of the fourth message until receipt of the fifth message, and estimates that an average of the calculated sums for the auctions is the seller's time.

14. A control method performed by an auction device, the auction device communicably connected to seller terminals, each being used by a seller who sells a product in an auction and bidder terminals, each being used by a bidder who is going to bid on a product in the auction, the auction device comprising a message relay, a history storage configured to store a history of relayed messages and an information generator, the control method comprising:

in response to a product in the auction being purchased, a message relay relaying messages about sale and purchase of the product exchanged between a seller of the product and a bidder who is the winning bidder of the product, between a seller terminal used by the seller and a bidder terminal used by the winning bidder; and estimating, by an information generator, based on a history of the bidder stored in the history storage, a bidder's time that is required by the bidder, for a period from when a not-yet purchased product is purchased until the product is dispatched;

in response to purchase of the product, the message relay, (1) receives a first message addressed to the winning bidder from the seller terminal that is used by the seller, the first message inquiring about an address of the winning bidder and a preferred payment method, and relays the first message to the bidder terminal, (2) receives a second message addressed to the seller from the bidder terminal, the second message informing the seller of the address of the winning bidder and the preferred payment method, and relays the second message to the seller terminal, (3) receives a third message addressed to the winning bidder from the seller terminal, the third message informing the winning bidder of a payment amount for the auction, and relays the third message to the bidder terminal, and (4) receives a fourth message addressed to the seller from the bidder terminal, the fourth message informing the seller that payment has been completed, and relays the fourth message to the seller terminal, and the information generator further calculates, for each of auctions at which the bidder won a bid on a product, a sum of time from receipt of the first message until receipt of the second message and time from receipt of the third message until receipt of the fourth message, and estimates that an average of the calculated sums for the auctions is the bidder's time.

15. A non-transitory computer-readable information recording medium that has recorded a program, the program causing a computer to function as an auction device communicably connected to seller terminals, each being used by a seller who sells a product in an auction and bidder terminals, each being used by the bidder who is going to bid on a product in the auction, the program causing the computer to function as:

a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;

a history storage configured to store a history of the relayed messages; and an information generator configured to estimate, based on a history of the seller stored in the history storage, a seller's time that is required by the seller, for a period from when a not-yet purchased product is purchased until the product is dispatched, estimate, based on a history of the bidder stored in the history storage, a bidder's time that is required by the bidder, for the period from when the not-yet purchased product is purchased until the product is dispatched, and determine an expected period that is required from when the not-yet purchased product is purchased until the product is dispatched, wherein the message relay, after the product is purchased, (1) receives a first message addressed to the winning bidder from the seller terminal that is used by the seller, the first message inquiring about an address of the winning bidder and a preferred payment method, and relays the first message to the bidder terminal, (2) receives a second message addressed to the seller from the bidder terminal, the second message informing the seller of the address of the winning bidder and the preferred payment method, and relays the second message to the seller terminal, (3) receives a third message addressed to the winning bidder from the seller terminal, the third message informing the winning bidder of a payment amount for the auction, and relays the third message to the bidder terminal, (4) receives a fourth message addressed to the seller from the bidder terminal, the fourth message informing the seller that payment has been completed, and relays the fourth message to the seller terminal, (5) receives a fifth message addressed to the winning bidder from the seller terminal, the fifth message informing the winning bidder that the product has been dispatched, and relays the fifth message to the bidder terminal, and (6) receives a sixth message addressed to the seller from the bidder terminal, the sixth message informing the seller that the product has arrived, and relays the sixth message to the seller terminal, and wherein the information generator calculates, for each of auctions at which the seller sold a product, a sum of time from when the product was purchased until receipt of the first message, time from receipt of the second message until receipt of the third message, and time from receipt of the fourth message until receipt of the fifth message, and estimates that an average of the calculated sums for the auctions is the seller's time, calculates, for each of auctions at which the bidder won a bid on a product, a sum of time from receipt of the first message until receipt of the second message and time from receipt of the third message until receipt of the fourth message, and estimates that an average of the calculated sums for the auctions is the bidder's time, and calculates a sum of the estimated seller's time and the estimated bidder's time, and employs the calculated sum as the expected period that is required from when the not-yet purchased product is purchased until the product is dispatched.

16. A non-transitory computer-readable information recording medium that has recorded a program, the program causing a computer to function as an auction device communicably connected to seller terminals, each being used by a seller who sells a product in an auction and bidder terminals, each being used by the bidder who is going to bid on a product in the auction, the program causing the computer to function as:

a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;

a history storage configured to store a history of the relayed messages; and an information generator configured to estimate, based on a history of the seller stored in the history storage, a seller's time that is required by the seller, for a period from when a not-yet purchased product is purchased until the product is dispatched, wherein the message relay, after the product is purchased, (1) receives a first message addressed to the winning bidder from the seller terminal that is used by the seller, the first message inquiring about an address of the winning bidder and a preferred payment method, and relays the first message to the bidder terminal, (2) receives a second message addressed to the seller from the bidder terminal, the second message informing the seller of the address of the winning bidder and the preferred payment method, and relays the second message to the seller terminal, (3) receives a third message addressed to the winning bidder from the seller terminal, the third message informing the winning bidder of a payment amount for the auction, and relays the third message to the bidder terminal, (4) receives a fourth message addressed to the seller from the bidder terminal, the fourth message informing the seller that payment has been completed, and relays the fourth message to the seller terminal, and (5) receives a fifth message addressed to the winning bidder from the seller terminal, the fifth message informing the winning bidder that the product has been dispatched, and relays the fifth message to the bidder terminal, and wherein the information generator calculates, for each of auctions at which the seller sold a product, a sum of time from when the product was purchased until receipt of the first message, time from receipt of the second message until receipt of the third message, and time from receipt of the fourth message until receipt of the fifth message, and estimates that an average of the calculated sums for the auctions is the seller's time.

17. A non-transitory computer-readable information recording medium that has recorded a program, the program causing a computer to function as an auction device communicably connected to seller terminals, each being used by a seller who sells a product in an auction and bidder terminals, each being used by the bidder who is going to bid on a product in the auction, the program causing the computer to function as:

a message relay configured to relay, once a product in the auction has been purchased, messages about sale and purchase of the product exchanged between a seller of the product and a bidder who is the winning bidder of the product, between a seller terminal used by the seller and a bidder terminal used by the winning bidder;

a history storage configured to store a history of the relayed messages; and an information generator configured to estimate, based on a history of the bidder stored in the history storage, a bidder's time that is required by the bidder, for a period from when a not-yet purchased product is purchased until the product is dispatched, wherein the message relay, after the product is purchased, (1) receives a first message addressed to the winning bidder from the seller terminal that is used by the seller, the first message inquiring about an address of the winning bidder and a preferred payment method, and relays the first message to the bidder terminal, (2) receives a second message addressed to the seller from the bidder terminal, the second message informing the seller of the address of the winning bidder and the preferred payment method, and relays the second message to the seller terminal, (3) receives a third message addressed to the winning bidder from the seller terminal, the third message informing the winning bidder of a payment amount for the auction, and relays the third message to the bidder terminal, and (4) receives a fourth message addressed to the seller from the bidder terminal, the fourth message informing the seller that payment has been completed, and relays the fourth message to the seller terminal, and wherein the information generator calculates, for each of auctions at which the bidder won a bid on a product, a sum of time from receipt of the first message until receipt of the second message and time from receipt of the third message until receipt of the fourth message, and estimates that an average of the calculated sums for the auctions is the bidder's time.

\* \* \* \* \*